(12) United States Patent
Salmeron-Medrano et al.

(10) Patent No.: US 10,382,662 B1
(45) Date of Patent: Aug. 13, 2019

(54) APPARATUS AND METHOD FOR LOCATING CAMERA TOWERS AND SCHEDULING SURVEILLANCE

(71) Applicant: The United States of America, as represented by the Secretary of the Navy, Arlington, VA (US)

(72) Inventors: Javier Salmeron-Medrano, Marina, CA (US); Roger Kevin Wood, Monterey, CA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/115,316

(22) Filed: Aug. 28, 2018

Related U.S. Application Data

(60) Provisional application No. 62/554,871, filed on Sep. 6, 2017.

(51) Int. Cl.
  *H04N 5/00* (2011.01)
  *H04N 5/232* (2006.01)
  (Continued)

(52) U.S. Cl.
  CPC ..... *H04N 5/23203* (2013.01); *H04N 5/23225* (2013.01); *H04N 5/23299* (2018.08); *H04N 5/247* (2013.01); *H04N 7/181* (2013.01)

(58) Field of Classification Search
  CPC .......... H04N 5/23203; H04N 5/23299; H04N 5/23225; H04N 5/247; H04N 7/181
  See application file for complete search history.

(56) References Cited

U.S. PATENT DOCUMENTS

| | | | |
|---|---|---|---|
| 9,245,170 B1* | 1/2016 | Nikic | G01S 17/89 |
| 2015/0356376 A1* | 12/2015 | Burghouts | G06K 9/6255 |
| | | | 382/159 |

(Continued)

OTHER PUBLICATIONS

Bodor et al., "Optimal Camera Placement for Automated Surveillance Tasks," J Intell Robot Syst 50 (2007).

(Continued)

*Primary Examiner* — Zhihan Zhou
(74) *Attorney, Agent, or Firm* — Naval Postgraduate School; Lisa A. Norris; James B. Potts

(57) ABSTRACT

An apparatus and method for the operation of, or the arrangement and operation of, a surveillance system comprising a plurality of camera towers, each of which comprises a plurality of cameras tasked with surveilling a plurality of points-of-interest (POIs). In its most general setting, given limited camera towers, the system (a) determines which locations should install towers, (b) evaluates surveillance requirements $f$ that specify the probability that each camera should surveil each POI at any point in time, and (c) generates a set of camera configurations and frequency-of-utilization vector $\alpha$ for those configurations that creates a surveillance schedule to meet requirements $f$ over T. By applying $\alpha$, the apparatus and method directs each camera to orient at successive time points to surveil in a manner that is relatively unpredictable to adversaries and which meets requirements $f$. In specialized embodiments, surveillance requirements and/or fixed placements of camera towers are pre-specified.

18 Claims, 6 Drawing Sheets

(51) Int. Cl.
*H04N 5/247* (2006.01)
*H04N 7/18* (2006.01)

(56) References Cited

U.S. PATENT DOCUMENTS

2016/0313120 A1* 10/2016 Shishalov ............ G08B 17/005
2018/0046885 A1* 2/2018 Barker ...................... G06T 7/75

OTHER PUBLICATIONS

Brown et al., "Defending Critical Infrastructure," Interfaces 36(6) (2006).

Costello et al., "Surveillance Camera Coordination Through Distributed Scheduling," Proceedings of the 44th IEEE Conference on Decision and Control, and the European Control Conference 2005 (2005).

Fu et al., "Simulation Optimization: A Review, New Developments, and Applications," Proceedings of the 2005 Winter Simulation Conference (2005).

Krahnstoever et al., "Collaborative Real-Time Control of Active Cameras in Large Scale Surveillance Systems," Workshop on Multi-camera and Multi-modal Sensor Fusion Algorithms and Applications—M2SFA2 2008 (2008).

Lacko et al., "Riot Simulation in Urban Areas," 14th IEEE International Symposium on Computational Intelligence and Informatics (2013).

Liu et al., "Maximal Lifetime Scheduling in Sensor Surveillance Networks," Proceedings IEEE 24th Annual Joint Conference of the IEEE Computer and Communications Societies, vol. 4 (2005).

Natarajan et al., "Decision-Theoretic Approach to Maximizing Observation of Multiple Targets in Multi-Camera Surveillance," Proceedings of the 11th International Conference on Autonomous Agents and Multiagent Systems, vol. 1 (2012).

Qureshi et al., "Surveillance camera scheduling: a virtual vision approach," Multimedia Systems (2006).

Salmeron et al., "Optimally Locating Surveillance Assets in Urban Areas," Proceeding of the International Defense and Homeland Security Simulation Workshop 2015 (2015).

Snyder, "Facility location under uncertainty: a review," IIE Transactions 38 (2006).

Wang, "Coverage Problems in Sensor Networks: A Survey," ACM Computing Surveys, vol. 43, No. 4, Article 32 (2011).

* cited by examiner

APPARATUS AND METHOD FOR LOCATING CAMERA TOWERS AND SCHEDULING SURVEILLANCE

RELATION TO OTHER APPLICATIONS

This application claims priority to and the benefit of U.S. Application 62/554,871 filed Sep. 6, 2017, which is hereby incorporated by reference in its entirety.

FIELD OF THE INVENTION

The present invention is directed to apparatus and method whereby a computer processor directs a plurality of surveillance cameras to configure in accordance with multiple configurations determined by the processor, in order to provide surveillance over multiple points-of-interest.

BACKGROUND

Area surveillance is important in a variety of applications in both military and civilian settings. A key challenge stems from the typical situation in which the number of locations needing surveillance is larger than the number of sensors available for collecting information. The complexity of the resulting surveillance environment makes execution of manual coordination and control extremely difficult, particularly as the number of cameras and targets increases, or when a limited number of cameras must surveil a significantly greater number of targets. In these situations, automatic control of available cameras is generally used to distribute available system-wide surveillance over the points-of-interest (POIs) where surveillance is desired. However, the methods employed often fail to fully optimize the assignment of a limited number of camera towers to a larger number of potential (secure) tower sites, and the capability of the system to provide appropriate surveillance periods for specific POIs is not fully exploited. Further, the methods currently employed may be overly scripted, so that an adversary seeking to impact (e.g., attack, plant a bomb, steal from) a certain POI may be able to predict when the surveillance system will be engaged in postures that render the adversary's actions detectable or undetectable.

It would be advantageous to provide a surveillance system that employs automatic control in a manner that optimizes and fully exploits the system's capability to provide, exactly or approximately, user-supplied or user-implied surveillance requirements for a large group of POIs. It would provide additional advantage if such a system could employ the automatic control in a manner relatively unpredictable to adversaries, such that aggregate long-term coverage satisfies surveillance requirements. It would provide further advantage if such a system provided, over a long term, the most efficient set of locations for a limited set of towers, with their associated cameras, and provided a scheduling process for surveillance that optimizes the use of those cameras.

These and other objects, aspects, and advantages of the present disclosure are further discussed in the following description.

SUMMARY

Provided here is an apparatus and method for the operation of a surveillance system comprising camera towers and a plurality of cameras tasked with surveilling a plurality of points-of-interest (POIs) utilizing in accordance with a set of surveillance requirements defined by a vector $f$. In certain embodiments, the apparatus and method provide camera-tower locations and the surveillance requirements $f$ based on the characteristics of a specific geographic operating area, user-supplied importance values for each POI and individual probabilities of detection for each POI. The surveillance requirements vector $f$ defines the probability that, at any point during a period of observation, each camera in the plurality should be surveilling each of the numerous POIs at any point in time. Thus, letting c index cameras and letting i index POIs, each element $f_{ci}$ of the vector $f$ satisfies $0 \leq f_{ci} \leq 1$, and for each camera c, $\Sigma_{i=1}^{n} = f_{ci} = 1$ such that each camera is constantly employed. Furthermore, in certain embodiments of the system, the restriction $$\sum_{c=1}^{m} f_{ci} \leq 1$$

is enforced, implying that at most one camera surveils any particular POI at a time.

The apparatus and method employs primal and dual optimization in order to satisfy the surveillance requirements $f$ efficiently and, in a manner relatively unpredictable to adversaries, the apparatus and method employs a dual optimization in order to generate a frequency-of-utilization vector $\alpha$ and a series of camera configurations through which surveillance requirements $f$ can be satisfied. The apparatus and method generally expresses each system configuration k as a specific configuration vector $g_k$, with a subvector $g_{kc}$ for each camera c. Each of the elements $g_{kci}$ in the subvector $g_{kc}$ equals either a first value or a second value such as 0 or 1 to indicate alignment or lack of alignment in configuration k of a specific camera c to a specific POI i. Here, alignment means that the camera is oriented so that the POI falls within the field of view (FOV) of the camera, the camera is focused on the POI and the image presented to the user is magnified to meet the user's predetermined requirements. The apparatus and method efficiently generates a set of K configuration vectors $g_k$, k=1, ..., K, and a frequency-of-utilization $\alpha_k$ for each configuration k, using a series of steps which iteratively execute a dual optimization method until the generated set of configuration vectors as a group satisfy the surveillance requirements $f$, at least to within a specified tolerance. Thus, the value of K is determined by the generation process.

Having generated the set of configuration vectors, the apparatus and method employs the set of configurations by repeatedly selecting and applying a configuration $g_k$ according to the frequency-of-utilization vector $\alpha$. That is, $g_k$ is chosen randomly with probability $\alpha_k$. Using this information, and a user-selected time-interval length $\Delta t$, the apparatus and method directs each camera to orient in successive time intervals: this method satisfies surveillance requirements $f$. In certain embodiments, the time-interval length $\Delta t$ may be produced randomly every time $g_k$ is chosen. The above process is referred to as a "dynamic probabilistic schedule" of the cameras. In certain embodiments, the method and apparatus utilizes detection probabilities and user-supplied importance values for POIs to determine an optimum placement of camera towers comprising the plurality of cameras in order to minimize the maximum damage that could occur at any POI, or to minimize the average damage across the entire plurality of POIs, or to satisfy some other objectively determined criteria.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventors for implementing the invention. Various modifications, however, will remain readily apparent to those skilled in the art, since the principles of the present invention are defined herein to specifically describe an apparatus and method for the operation of a surveillance system utilizing a plurality of cameras to surveil a plurality of geographical points, termed points-of-interest (POIs).

Provided here is an apparatus and method for the operation of a surveillance system comprising a plurality of cameras and tasked with surveilling a plurality of POIs. Typically the plurality of POIs in quantity greatly exceeds the quantity of available cameras comprising the plurality of cameras. The apparatus and method disclosed employs surveillance requirements $f$, which is a vector that defines the probability that each camera in the plurality should be surveilling each of the numerous POIs at any time during a specified period of observation T and, using a dual optimization method, generates a frequency-of-utilization vector $\alpha$ as well as an efficient series of camera configurations through which the surveillance requirements $f$ are substantially satisfied over T. The apparatus and method directs each camera to orient in successive time intervals using a probability distribution function defined by the final frequency-of-utilization vector $\alpha$ determined and employs automatic control in a manner that provides surveillance satisfying the established surveillance requirements for individual POIs in a manner relatively unpredictable to adversaries. Because cameras can be controlled quickly compared to the length of the period of observation T, the small amount of surveillance time lost by switching from one camera to another is ignored in calculations. In certain embodiments, the method and apparatus utilizes user-provided detection probabilities and other data (e.g., importance values for each POI) to determine an optimum placement of camera towers comprising the plurality of cameras in order to schedule camera surveillance sessions and minimize total expected damage to POIs, or some satisfy some other objectively determined criteria.

Figure 1:
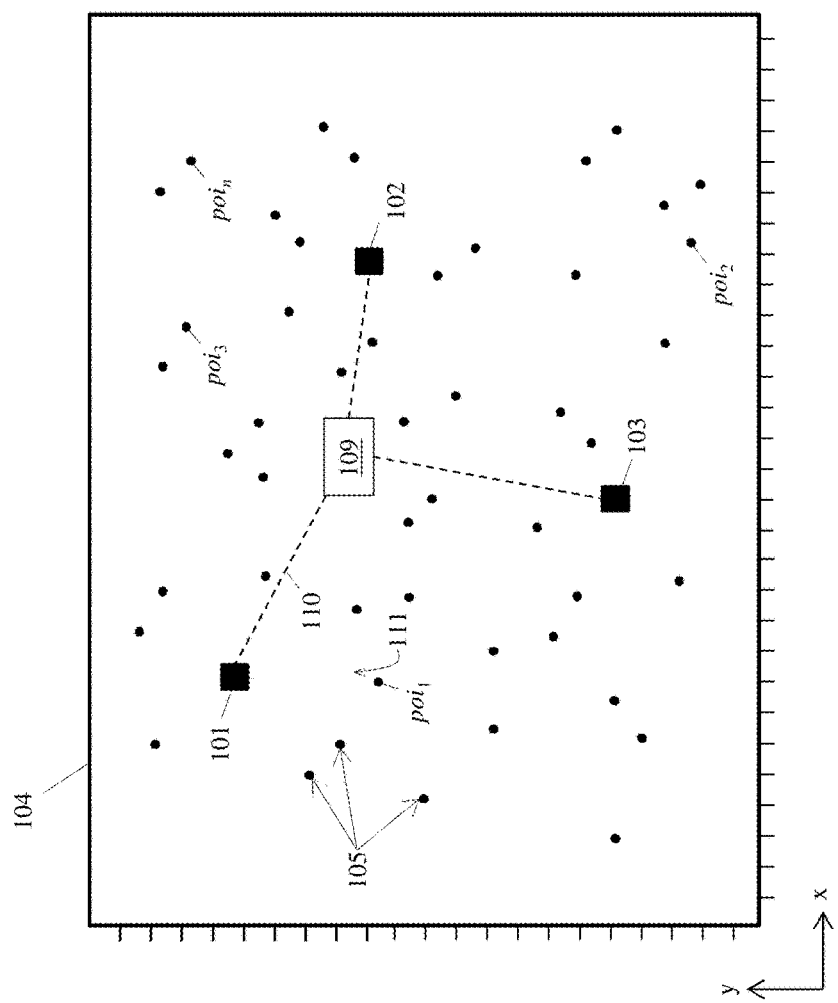
FIG. 1 illustrates an exemplary surveillance system tasked to surveil a plurality of points-of-interest located on a geographic operating area.

FIG. 1 illustrates an exemplary embodiment of the surveillance system disclosed. The system comprises a plurality of camera towers such as towers 101, 102, and 103, with each camera tower comprising at least one camera. The camera towers 101, 102, and 103 are tasked with providing surveillance over a plurality of POIs generally indicated as 105 and comprising points such as POIs $poi_1$, $poi_2$, and $poi_3$, in addition to the others illustrated. Each camera tower 101, 102, and 103 is located at a camera-tower location within a geographic operating area 104, and each POI is located at a POI location within the same geographic operating area 104. Geographic operating area 104 is provided with some coordinate system such as the x-y coordinate system illustrated in order to define each camera-tower location and each POI location within geographic operating area 104. The system further comprises processor 109, where processor 109 is a programmable digital device. Processor 109 is in data communication with each of the cameras in camera towers 101, 102, and 103 through communication links such as 110. Each camera comprises a motor and motor controller for the purpose of aligning the camera's FOV toward the POI, focusing on the POI of interest and magnifying the image to meet the user's predefined requirement, such as the camera comprising camera tower 101 and having FOV 111, and whose motor controller is in data communication with processor 109.

The plurality of camera towers such as 101, 102, and 103 is tasked with providing surveillance over the plurality of POIs 105 within geographic operating area 104. However as illustrated, the quantity of POIs exceeds the capability of the plurality of camera towers 101, 102, and 103 to provide constant surveillance of each POI due to the factors such as low probability of detection due to distance or FOV limitations. Further, in a scenario where damaging events at one or more POIs might be directed by an intelligent adversary, this adversary might be capable of recognizing set surveillance patterns and react to avoid detection. As a result, it is desired that the cameras comprising the plurality of camera towers be scheduled so that they satisfy, in probability, the surveillance requirements $f$ during the total time period T, while additionally executing those surveillance requirements $f$ in a manner that increases the difficulty of anticipating one or more POIs being surveilled at a given time. The system illustrated provides these features by initially determining a plurality of camera configurations that, in toto, substantially satisfies the surveillance requirements $f$. Subsequently and at intervals of user-selected or random length $\Delta t$, the system provides camera direction based on establishing each configuration within the period T during which the surveillance requirements $f$ applies, in order that the surveillance system as a whole operates to satisfy $f$ in a relatively unpredictable manner to an adversary. In certain embodiments, the surveillance requirements $f$ are not input data but, rather evaluated to minimize the maximum damage that could occur at any POI should a damaging event go undetected, or to minimize the average damage across the entire plurality of POIs, or some other criterion.

Figure 2:
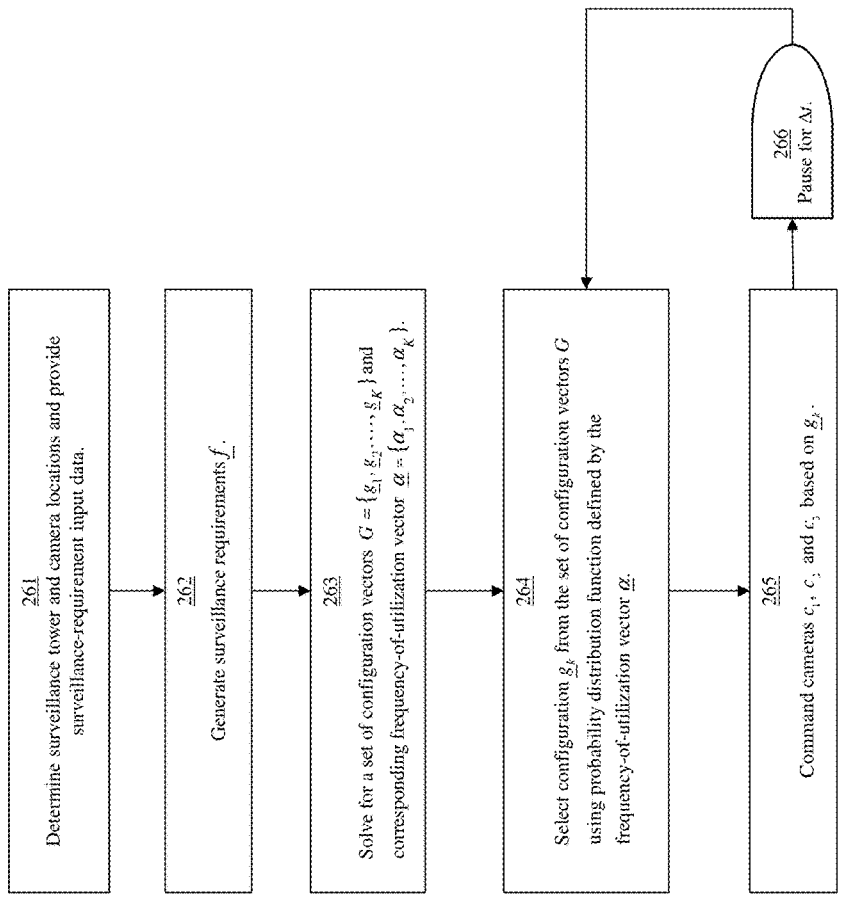
FIG. 2 illustrates an embodiment of the process employed by the apparatus and method.

In brief and as will be discussed further, an embodiment of the surveillance system conducts the general process illustrated in FIG. 2. At 261, surveillance-requirements input, based on camera-tower locations and the number of cameras on each tower, is provided. In some embodiments, the processor itself conducts a series of operations and determines optimal camera-tower locations and surveillance-requirements $f$ based on some criteria. At 262, the processor generates surveillance requirements $f$ from environmental and user-defined data, where the vector $f$ defines the probability that each camera in the system should align toward each POI in the plurality of POIs during the period of surveillance T.

At 263, the processor generates an optimal set of configuration vectors $G=\{g_1, g_2, \ldots, g_K\}$ and a corresponding frequency-of-utilization vector $\alpha=(\alpha_1, \alpha_2, \ldots, \alpha_K)$. This generation process is presented in detail in FIG. 3. All generated configuration vectors $g_k$ comprise an element $g_{kci}$ for every combination of a specific camera and a specific POI, so that the element $g_{kci}$ indicates whether the specific camera c is oriented toward and focused on a specific POI i in configuration k or if is not.

Beginning at 264, the processor dynamically implements the probabilistic schedule by repeatedly, independently selecting a configuration $g_k$ from among the configuration vectors using the probability distribution function (PDF) that the frequency-of-utilization vector $\alpha$ defines. In some embodiments, a new configuration $g_k$ is selected every $\Delta t$ units of time but, to enhance unpredictability, $\Delta t$ can be chosen randomly, according to a PDF that is independent of $\alpha$. As stated, each element $\alpha_k$ is associated with a specific configuration vector $g_k$ comprising the set of configuration vectors and, based on the formulation described in FIG. 3, each element $\alpha_k$ represents the frequency at which the specific configuration vector $g_k$ should be applied to the plurality of cameras. As a result, by using the PDF based on the final frequency-of-utilization vector $\alpha$ for each selection of a new $g_k$ at each new interval of length $\Delta t$, the processor provides surveillance of each individual POI comprising the plurality of POIs in a manner that substantially satisfies the requirements of the surveillance requirements $f$. The processor issues commands to cameras such as $c_1$, $c_2$ and $c_3$ in accordance with the selected $g_k$ at 265, maintains the selected $g_k$ for the next time interval of length $\Delta t$ at 266, and then returns to 264 to again utilize the PDF to select a new $g_k$ to be applied over the next time interval of length $\Delta t$. In this embodiment, the configuration-selection process continues indefinitely, but it could also be terminated after the summation of all of the $\Delta t$ meets or exceeds T.

Additional details of certain embodiments of the process are discussed below.

In certain embodiments where the locations of each POI and each camera tower are established as within the geographic operating area 104 of FIG. 1, processor 109 receives surveillance-requirements input and generates surveillance requirements $f$, where $f$ is a vector that describes the probability with which each specific camera should surveil each specific POI. For example, the surveillance requirements for a system of m cameras 1 through m surveilling POIs 1 through n might be represented as a vector such as $(f_{11}, f_{12}, f_{12}, \ldots f_{1n}, f_{21}, f_{22}, \ldots f_{2n}, f_{31}, \ldots, f_{mn})$ where each element $f_{ci}$ satisfies $0 \leq f_{ci} \leq 1$, and in a typical embodiment for each camera c, $$\sum_{c=1}^{n} f_{ci} = 1$$

such that a given camera is always being employed over the total time period of surveillance. Based on the surveillance requirements $f$, processor 109 is further programmed to generate a plurality of camera configurations which as a group can be used to satisfy the requirements of the surveillance requirements $f$ using a dual optimization method, as will be discussed. The new (primal and dual) optimization models implemented in processor 109 allow processor 109 to produce an optimal set of configuration vectors and frequency-of-utilization vector that satisfy the surveillance requirements $f$. In other embodiments, prospective camera-tower locations are undetermined within geographic operating area 104, and processor 109 is further programmed to determine optimum camera-tower locations as well, in order to minimize the maximum possible damage to the plurality of POIs 105, minimize the average damage to the plurality of POIs 105, or to optimize some other objective criteria.

For example, for the exemplary system of illustrated of FIG. 1, cameras comprising camera towers 101, 102, and 103 are tasked with surveilling the plurality of POIs 105 consisting of $poi_1$, $poi_2$, $poi_3$, and the other illustrated POIs through to $poi_n$. In this embodiment, camera towers 101, 102, and 103 are established and occupy known camera-tower locations within geographic operating area 104. It is desired that cameras comprising camera towers 101, 102, and 103 coordinate in some manner to surveil each of the POIs for some specified interval of time over a total time period in accordance with provided surveillance-scenario data. Processor 109 receives that input data and generates surveillance requirements $f$ based on the surveillance-scenario input data.

As discussed, the surveillance requirements $f$ can be expressed as a vector having elements $f_{ci}$, where each $f_{ci}$ specifies the probability that a given camera c mounted on a given camera tower should align toward a given POI i during the period of observation T. Within the surveillance requirements $f$, each $f_{ci}$ is greater than or equal to zero and less than or equal to one, and a summation across i of the $f_{ci}$ corresponding to a given camera c equals the total fraction of the time period that surveillance on POI i should be conducted from camera c. For example, a vector providing a desired surveillance requirements $f$ relative to the system of FIG. 1, and where a camera $c_1$ provides surveillance from camera tower 101, a camera $c_2$ provides surveillance from camera tower 102, and a camera $c_3$ provides surveillance from camera tower 103, might be expressed as $(f_{c1,1}, f_{c1,2}, \ldots, f_{c1,n}, f_{c2,1}, f_{c2,2}, \ldots, f_{c2,n}, f_{c3,1}, f_{c3,2}, \ldots, f_{c3,n})$ with $f_{ci} \geq 0$, and with $$\sum_{c=1}^{m} f_{c1,i} = 1, \sum_{i=1}^{n} f_{c2,i} = 1 \text{ and } \sum_{i=1}^{n} f_{c3,i} = 1.$$

Note that, to avoid using small, hard-to-read symbols, subscripted subscripts are not used. For example, the text might refer to "camera $c_2$," but $c_2$ becomes "c2" when used as a subscript, e.g., $f_{c2,1}$. In typical embodiments, the surveillance requirements $f$ comprises a subset of elements $f_c$ corresponding to every camera c comprising the plurality of camera towers, and each element $f_{ci}$ within the subset corresponds to the individual camera c and a specific each POI i within the plurality of POIs 105. For example and relative to FIG. 1, corresponding subsets of elements might be $(f_{c1,1}, f_{c1,2}, \ldots, f_{c1,n})$ for a camera $c_1$ comprising camera tower 101, $(f_{c2,1}, f_{c2,2}, \ldots, f_{c2,n})$ for a camera $c_2$ comprising camera tower 102, and $(f_{c3,1}, f_{c3,2}, \ldots, f_{c3,n})$ for a camera $c_3$ comprising camera tower 103. As a result, each element $f_{ci}$ is associated with a specific camera c and a specific POI i. In this particular embodiment, processor 109 receives surveillance requirements $f$ as an input and generates a set of configuration vectors sufficient to satisfy the surveillance requirements $f$, in order to generate a dynamic probabilistic schedule for each camera comprising a camera tower.

Processor 109 generates and tracks appropriate configurations of the surveillance system that satisfy the surveillance requirements $f$ using configuration vectors $g_k$, each comprising elements $g_{kci}$. Further, within this disclosure, it is understood that a "camera tower" may be any structure comprising one or more cameras tasked with surveilling one or more POIs. Within the methodology of processor 109 and for a given configuration vector $g_k$, each element $g_{kci}$ is equal to either a first value or a second value, for example, 0 or 1. Further, a "0-1" vector means a vector comprising elements where each element is equal to 0 or is equal to 1. Additionally, each element $g_{kci}$ indicates alignment or lack of alignment to an individual POI i of a specific camera c comprising the plurality of camera towers, and provides an indication of the alignment or the lack of alignment of every camera c with every POI i in the plurality of POIs 105. For example, a configuration vector $g_k$ relative to the system of FIG. 1, might be expressed as $(g_{k,c1,1}, g_{k,c1,2}, \ldots, g_{k,c1,n}, g_{k,c2,1}, g_{k,c2,2}, \ldots g_{k,c2,n}, g_{k,c3,1}, g_{k,c3,2}, \ldots, g_{k,c3,n})$, where each $g_{kci}$ is equal to 1 or 0 to indicate alignment or lack of alignment, respectively, of camera c to POI i, and where the index k indicates a $k^{th}$ configuration vector. As will be discussed, processor 109 acts in a specific and efficient manner to generate a plurality of $g_k$ until the resulting set of configuration vectors and corresponding frequency-of-utilization vector $\alpha$ satisfy the surveillance requirements $f$. In every embodiment for a given $g_k$, $$\sum_{i=1}^{n} g_{kci} = 1$$

indicating that camera c is only aligned with a single POI within the given configuration $g_k$, but in some embodiments $$\sum_{c=1}^{m} g_{kci} \leq 1$$

indicating that each POI is surveilled by at most one camera c in a configuration $g_k$. In the embodiment described herein, a given configuration vector $g_k$ comprises a vector subset of elements $g_{kc}$ corresponding to every camera comprising the plurality of camera towers and such that the each element $g_{kci}$ in the subset corresponds to the individual camera and each POI, such as, for example, a subset of elements $(g_{k,c1,1}, g_{k,c1,2}, \ldots, g_{k,c1,n})$ for camera $c_1$ comprising camera tower 101, $(g_{k,c2,1}, g_{k,c2,2}, \ldots, g_{k,c2,n})$ for camera $c_2$ comprising camera tower 102, and $(g_{k,c3,1}, g_{k,c3,2}, \ldots, g_{k,c3,n})$ for camera $c_3$ comprising camera tower 103. As a result, each element $g_{kci}$ is associated with a specific camera and a specific POI, and is additionally associated with a single element $f_{ci}$ comprising the surveillance requirements $f$. Processor 109 generates a series of configurations represented by a plurality of configuration vectors $g_k$ which may be employed according to a to satisfy the desired surveillance requirements $f$.

Within this disclosure, a camera c achieves "alignment" toward a specific POI i when the camera c has an orientation such that the POI i is within the FOV of the camera, the camera is focused on the POI and the image presented to the user is magnified to meet the user's pre-specified requirements. Similarly, a camera c has "lack of alignment" toward a specific POI i when camera c has an orientation such that the POI i is not within the FOV of camera c or the camera is not focused on the POI or the magnification does not meet requirements. For example at FIG. 1, where $poi_1$ is depicted within FOV 111 of the at least one camera comprising camera tower 101, the at least one camera can have alignment toward $poi_1$ in the depiction. Similarly at FIG. 1, the at least one camera comprising camera tower 101 has a lack of alignment toward, for example, $poi_2$, $poi_3$, and so on to $poi_n$. Alignment or lack of alignment may be determined and expressed by any appropriate means in the art. In a particular embodiment, for a given POI, alignment or lack of alignment toward an individual POI is designated based on an assignment vector between the given POI and the individual camera.

Figure 3:
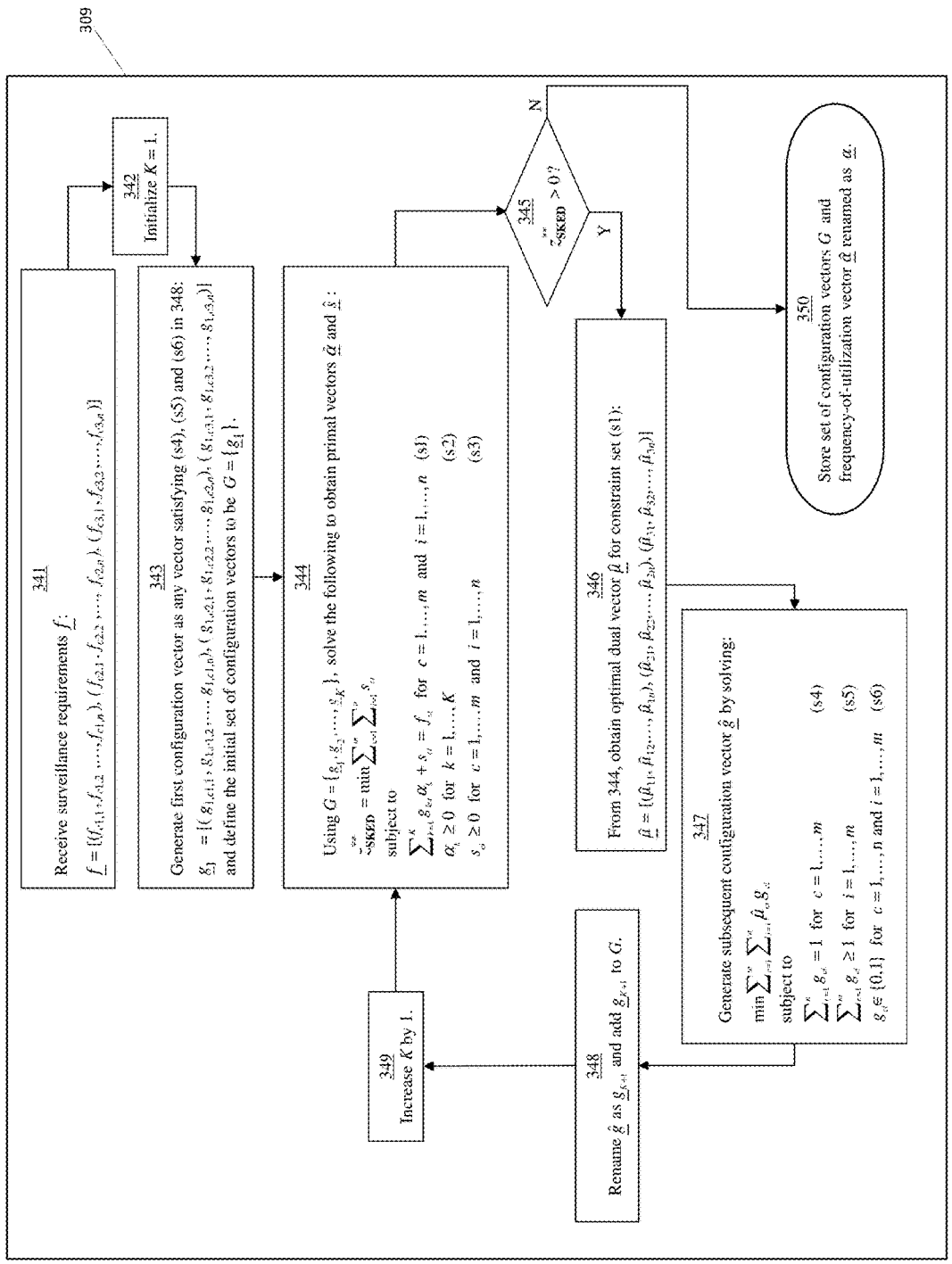
FIG. 3 illustrates a second embodiment of the process employed by the apparatus and method.

FIG. 3 illustrates a particular embodiment of the system that generates a set of configuration vectors $G=\{g_1, g_2, \ldots, g_K\}$ and a corresponding frequency-of-utilization vector $\alpha=(\alpha_1, \alpha_2, \ldots, \alpha_K)$. Together, G and a are used so that individual camera orientations can be combined to satisfy desired surveillance requirements $f$. FIG. 3 illustrating processor 309 and cameras $c_1$, $c_2$, and $c_3$ where each camera is located on a camera tower, such as camera tower 101, 102, or 103 of FIG. 1. In the embodiment shown, at step 341, processor 309 receives surveillance-requirements input $f$ that defines the probability that, at any point during a period of observation T, each of cameras $c_3$ is to be assigned to surveil a specific POI, such as one or more of $poi_1$ through $poi_n$ of FIG. 1. In other embodiments, processor 309 would receive the raw, surveillance-requirements input data and generate the vector $f$ using that data. The surveillance requirements $f$ comprise elements $f_{ci}$ for every camera comprising the plurality of camera towers, and comprising a subset of elements for each camera with the subset defining the probability that each camera should surveil each POI within the plurality of POIs at any point during the observation period T. For example at FIG. 3, processor 309 receives a subset $f_{c1}$ with elements of $(f_{c1,1}, f_{c1,2}, \ldots, f_{c1,n})$ for the camera $c_1$ defining the probability that at any point during the observation period T that $c_1$ surveils each POI in the plurality of POIs; processor 309 also receives another subset $f_{c2}$ with elements of $(f_{c2,1}, f_{c2,2}, \ldots, f_{c2,n})$ for the camera $c_2$ defining the probability that at any point during the observation period T that $c_2$ surveils each POI in the plurality of POIs; and processor 309 further receives $f_{c3}$ with elements of $(f_{c3,1}, f_{c3,2}, \ldots, f_{c3,n})$ for the camera $c_3$ defining the probability that at any point during T that $c_3$ surveils each POI in the plurality of POIs. Processor 309 then defines the complete surveillance requirements $f$ comprising each of $f_{c1}$, $f_{c2}$ and $f_{c3}$ as $$f=[(f_{c1,1}, f_{c1,2}, \ldots, f_{c1,n}), (f_{2,1}, f_{c2,2}, \ldots f_{c2,n}), (f_{c3,1}, f_{c3,2}, \ldots f_{c3,n})].$$

As a result, each element $f_{ci}$ is associated with a specific camera and a specific POI. As discussed, each $f_{ci} \geq 0$, and for each camera c, $$\sum_{i=1}^{n} f_{ci} = 1.$$

The embodiment in which processor 309 must generate $f$ from raw input data will be discussed later.

At step 342, processor 309 initializes a counter K of configuration vectors to 1. At step 349, K is updated and defines how many configuration vectors have been generated in the process of generating a complete set of configuration vectors that will satisfy surveillance requirements $f$.

At step 343, processor 309 commences a series of steps in order to establish the set of configuration vectors that will satisfy the surveillance requirements $f$ to within the criteria associated with $z_{SKED}**$ in step 345. At step 343, processor 309 generates a first configuration vector $g_1$ having the characteristics outlined above. For example at FIG. 3 and for the cameras $c_1$, $c_2$ and $c_3$ and POIs 1 through n, processor 309 generates a first configuration vector $g_1$ comprising a subset $g_{1,c1}$ of $(g_{1,c1,1}, g_{1,c1,2}, \ldots, g_{1,c1,n})$ for the camera $c_1$ defining alignment or lack of alignment of $c_1$ with each POI in the plurality of POIs, another subset $g_{1,c2}$ of $(g_{1,c2,1}, g_{1,c2,2}, \ldots g_{1,c2,n})$ for the camera $c_2$ defining alignment of lack or alignment of $c_2$ with each POI in the plurality of POIs, and a further subset $g_{1,c3}$ of $(g_{1,c3,1}, g_{1,c3,2}, \ldots, g_{1,c3,n})$ for the camera $c_3$ defining alignment or lack of alignment of $c_3$ with each POI in the plurality of POIs. Processor 309 further defines the first configuration vector $g_1$ comprising each of $g_{1,c1}$, $g_{1,c2}$, and $g_{1,c3}$ as $$g_1 = [(g_{1,c1,1}, g_{1,c1,2}, \ldots, g_{1,c1,n}), (g_{1,c2,1}, g_{1,c2,2}, \ldots g_{1,c2,n}), (g_{1,c3,1}, g_{1,c3,2}, \ldots, g_{1,c3,n})].$$

Correspondingly, each element $g_{1,ci}$ is associated with a specific camera and a specific POI, and is additionally associated with a single element $f_{ci}$ comprising the requirements $f$. The first configuration vector $g_1$ may be generated randomly or in a more deliberate fashion. At step 343, processor 309 further adds the first configuration vector $g_1$ to the set of configuration vectors, this set being initially empty.

At 344, processor 309 establishes a provisional frequency-of-utilization vector $\hat{\alpha}$, which comprises elements $\hat{\alpha}k$ for $k=1, \ldots, K$. Each element $\hat{\alpha}_k$ is associated with a single configuration vector $g_k$ comprising the current set of configuration vectors. At step 344, both the frequency-of-utilization vector $\alpha$ and a vector s are quantified as $\hat{\alpha}$ and $\hat{s}$, respectively. This quantification uses a primal objective function which minimizes a summation of the elements of the vector s. The vector s comprises a subset of elements for each camera relative to each POI in the plurality of POIs. For example and relative to the conditions of FIG. 3, the vector s comprises a subset $s_{c1}$ of $(s_{c1,1}, s_{c1,2}, \ldots, s_{c1,n})$ for the camera c, another subset $s_{c2}$ of $(s_{c2,1}, s_{c2,2}, \ldots, s_{c2,n})$ for the camera $c_2$, and a further subset $s_{c3}$ of $(s_{c3,1}, s_{c3,2}, \ldots, s_{c3,n})$ for the camera $c_3$, with the vector s expressed as $$s = [(s_{c1,1}, s_{c1,2}, \ldots, s_{c1,n}), (s_{c2,1}, s_{c2,2}, \ldots, s_{c2,n}), (s_{c3,1}, s_{c3,2}, \ldots, s_{c3,n})].$$

As a result, each element $s_{ci}$ is associated with an individual element $f_{ci}$ comprising the surveillance requirements $f$. The minimization of the primal objective function is subject to a set of primal constraints including a first constraint set (s1), which establishes a relationship between the vector s, the surveillance requirements $f$, and the frequency-of-utilization vector $\alpha$ for each configuration $g_k$. Within the first constraint set (s1) and in certain embodiments, each single element $s_{ci}$ associated with an individual $f_{ci}$ is equal to a difference between the individual $f_{ci}$, and a dot product of a first vector and a second vector, where the first vector comprises all elements $g_{kci}$ associated with the individual $f_{ci}$ in the set of configuration vectors, and where the second vector comprises all elements $\alpha_k$ comprising the frequency-of-utilization vector $\alpha$. Stated similarly, a single element $s_{ci}$ corresponding to a specific camera and a specific POI equals the difference between the $f_{ci}$ of the surveillance requirements $f$ which corresponds to the specific camera and the specific POI and a dot product of a first vector and a second vector, where the first vector comprises all elements $g_{kci}$ in the set of configuration vectors which also correspond to the specific camera and the specific POI, and where the second vector comprises all elements $\alpha_k$ comprising the frequency-of-utilization vector $\alpha$. Here "dot product" connotes an operation as known in the art whereby for a first vector x of dimension r and a second vector y of dimension r, the dot product x·y is a real-valued function expressed as $$\sum_{j=1}^{r} x_j y_j.$$

For example, when $r=3$, $x=(x_1, x_2, x_3)$ and $y=(y_1, y_2, y_3)$, then $x \cdot y = x_1 y_1 + x_2 y_2 + x_3 y_3$.

Figure 4:
FIG. 4 illustrates a third embodiment of the process employed by the apparatus and method.

As further example, for the initial performance of step 344, when the set of configurations generated by processor 309 comprises only the initial configuration vector $g_1$, and the frequency-of-utilization vector $\alpha$ correspondingly comprises only $\alpha_1$, and using the example for $c_1$, $c_2$ and $c_3$ and POIs 1 through n, the first constraint set (s1) reduces to the expressions listed under the group of vector formulations indicated by $k=1$ in FIG. 4. As illustrated by the $k=1$ vector formulations, the vector s comprises elements $[(s_{c1,1}, s_{c1,2}, \ldots, s_{c1,n}), (s_{c2,1}, s_{c2,2}, \ldots, s_{c2,n}), (s_{c3,1}, s_{c3,2}, \ldots, s_{c3,n})]$, and each element $s_{ci}$ corresponding to a specific camera and a specific POI represents a difference between the $f_{ci}$ of the surveillance requirements $f$ corresponding to the specific camera and the specific POI, and a dot product of a first vector and a second vector. As stated, the first vector comprises all elements $g_{kci}$ in the set of configuration vectors which also correspond to the specific camera and the specific POI element. With $k=1$ and referring to the initial configuration vector $g_1$ in the set of configuration vectors, the first vector comprises only $g_{1,c1,1}$ for the element $s_{c1,1}$, it comprises $g_{1,c1,2}$ for the element $s_{c1,2}$, it comprises $g_{1,c1,3}$ for the element $s_{c1,3}$, and so on to $g_{1,c3,n}$ for the element $s_{c3,n}$. Similarly with $k=1$, the second vector comprises only $\alpha_1$. The dot product of each first vector comprising the applicable $g_{1ci}$ and the second vector comprising $\alpha_1$ is illustrated as $g_{1,c1,1}\alpha_1$, $g_{1,c1,2}\alpha_1$, $g_{1,c1,3}\alpha_1$, and so on to $g_{1,c3,n}\alpha_1$. The minimization of the primal objective function is further subject to a second constraint set (s2) specifying that every element in the frequency-of-utilization vector $\alpha$ is greater than or equal to zero, and a third constraint set (s3) specifying that every element in the vector $s_{ci}$ is greater than or equal to zero. As noted at FIG. 4, the criteria for constraint set (s1) updates at each iteration of steps 344-349, as previously discussed.

Following the minimization of the primal objective function and the subsequent quantification of the vector s, at step 344 processor 309 conducts a summation of the elements $s_{ci}$, and stores it as the value $z_{SKED}$. In a typical embodiment, after sufficient configuration vectors have been generated to satisfy surveillance requirements $f$, the final value of $z_{SKED}$ is equal to zero expressed to some finite number of significant digits, such as 0.00. (Thus, henceforth, all comparisons of $z_{SKED}$ to zero actually refer to comparisons of $z_{SKED}$ to zero expressed to some finite number of significant digits.) At step 345 processor 309 tests if $z_{SKED}$ is close enough to zero to determine if sufficient configuration vectors have been generated to satisfy the surveillance requirements $f$ and, if so, proceeding to step 350. If $z_{SKED}$ is not close enough to zero at step 345, a subsequent configuration vector $\hat{g}$ must be added to the set of configuration vectors by proceeding to steps 346 and then 347.

At step 346, processor 309 extracts the optimal dual vector $\hat{\mu}$ associated with constraint set (s1) at step 344. Formulation of a dual model with dual variables like $\mu$ and the solution of that model via the corresponding primal model is well known in the art. For example, see K. V. Mital, *Optimization Methods in Operations Research and Systems Analysis* ($3^{rd}$, 1996); see also I. I. Eremin, *Theory of Linear Optimization* (2002); see also I. Maros, *Computational Techniques of the Simplex Method* (2003), among many others. The valued dual vector $\hat{\mu}$ comprises elements $\hat{\mu}_{ci}$, and parallels the valued primal vector $\hat{s}$, which has elements $\hat{s}_{ci}$. For example, using the instance with cameras $c_1$, $c_2$ and $c_3$ and POIs 1 through n, the valued dual vector $\hat{\mu}$ may be expressed as $$[(\hat{\mu}_{c1,1},\hat{\mu}_{c1,2},\ldots,\hat{\mu}_{c1,n}),(\hat{\mu}_{c2,1},\hat{\mu}_{c2,2},\ldots,\hat{\mu}_{c2,n}),(\hat{\mu}_{c3,1},\hat{\mu}_{c3,2},\ldots,\hat{\mu}_{c3,n})].$$

At step 347, processor 309 generates the subsequent configuration vector $\hat{g}$, where the subsequent configuration vector $\hat{g}$ comprises elements $\hat{g}_{ci}$, with each element $\hat{g}_{ci}$ equal to either a first value or a second value such as 1 or 0 to indicate alignment or lack of alignment of a specific camera c with an individual POI i. Processor 309 generates the subsequent configuration vector $\hat{g}$ by minimizing an assignment objective function comprising a dot product of a third vector and a fourth vector, where the third vector comprises the valued dual vector $\hat{\mu}$ and the fourth vector g, whose solution defines a new configuration vector $\hat{g}$. The minimization of the assignment objective function is subject to a constraint set (s4) where each camera comprising the plurality of cameras is aligned toward some POI in the plurality of POIs, and is subject to an additional constraint set (s5) where only a single camera comprising the plurality of cameras is aligned toward a specific POI comprising the plurality of POIs. In addition, constraint set (s6) ensures that the generated configuration vector is a valid 0-1 vector. Minimizing the assignment objective function using the valued dual vector $\hat{\mu}$ and subject to the constraints described generates the subsequent configuration vector $\hat{g}$.

Following generation of the subsequent configuration vector $\hat{g}$ at step 347, processor 309 proceeds to step 348 and adds the subsequent configuration vector $\hat{g}$ to the set of configuration vectors by storing $\hat{g}$ as $g_{K+1}$. Processor 309 then proceeds to step 349 and updates the configurations counter K. Processor 309 then repeats steps 344-349 using the updated set of configuration vectors. For example, after the initial iteration of steps 344-349, the set of configurations vectors is updated to comprise both the initial configuration vector $g_1$ and the subsequent configuration vector $\hat{g}$ provided at step 347 and which is renamed as $g_2$ at step 348. The set of configuration vectors now comprises G={$g_1,g_2$} and the configurations counter is updated to K=2 at step 349. Accordingly, at 344, the frequency-of-utilization vector $\alpha$ is established as ($\alpha_1$, $\alpha_2$). Also at step 344, the constraint set (s1) is updated and expressed by the vector formulations generally indicated by k=1, 2 at FIG. 4 before proceeding to step 345 for evaluation of the elements $s_{ci}$, and steps 346-349 or 350 as applicable. At each repetition, the frequency-of-utilization vector $\alpha$ is established at 344 where the (s1) constraint set is updated to reflect the current set of configuration vectors, such as the vector formulations generally indicated by k=3 at FIG. 4 for a set having 3 configuration vectors, and continuing on to the vector formulations generally indicated by k=K for a set having K configuration vectors. Processor 309 continues this repetition until the value $z_{SKED}$** comprising the summation of the elements $s_{ci}$ at step 344 is sufficiently close to zero.

The dual optimization method employed by processor 309 over steps 344-349 provides an efficient set of configuration vectors which satisfy the surveillance requirements $f$ in a manner reducing the number of individual camera operations a given camera might be required to execute over the total time period.

Once a set of configuration vectors has been generated sufficient to no longer satisfy $z_{SKED}$**>0 at step 345, processor 309 concludes at step 350 by storing the configuration vectors and their frequency of utilization so they can be used in scheduling or directing each individual camera comprising the plurality of camera towers to align in accordance with each configuration vector in the set of configuration vectors. In this manner, processor 309 provides the configuration vectors and frequencies of utilization that enable a dynamic probabilistic scheduling of the cameras that satisfies the surveillance requirements $f$ over the time period T.

Figure 5:
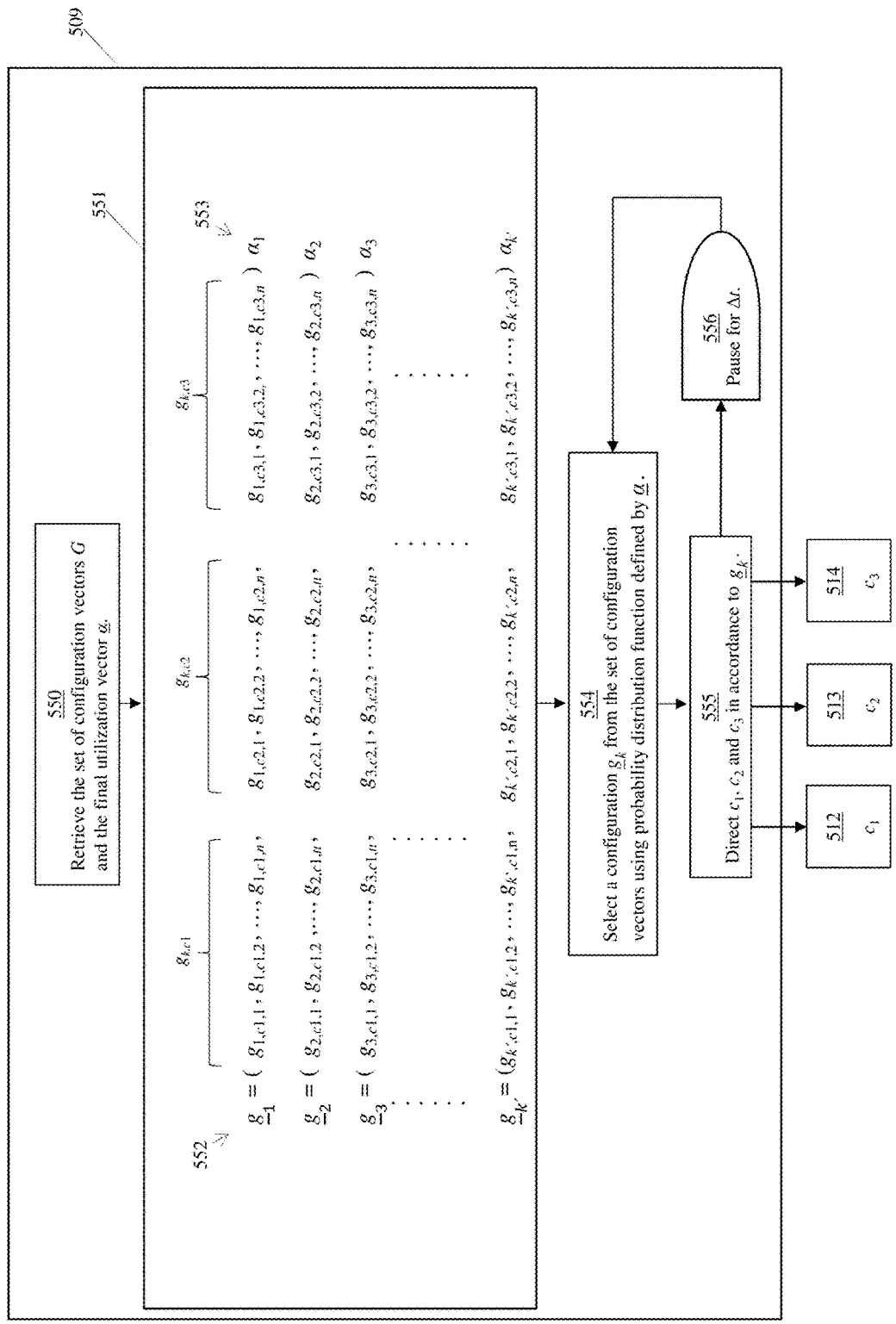
FIG. 5 illustrates a fourth embodiment of the process employed by the apparatus and method.

At step 350, processor 309 selects individual configuration vectors $g_k$ from the finalized set of configuration vectors using the PDF that is defined by the final frequency-of-utilization vector $\alpha$. A particular embodiment is illustrated at FIG. 5. At step 550, processor 509 retrieves a final utilization vector $\alpha$ and the set of configuration vectors G generated following step 350 of FIG. 3. Processor 509 loads $\alpha$ and G into a memory 551, generating the set of configuration vectors indicated at 552 and the final utilization vector $\alpha$ generally indicated at 553. For illustration, the set of configuration vectors 552 are indexed 1 through K and comprise configuration vectors $g_1$, $g_2$ and so on to $g_K$. As indicated, each configuration vector has a subset of elements $g_{kc}$ for each of cameras $c_1$, $c_2$, and $c_3$, with the subsets indicated by $g_{k,c1}$, $g_{k,c2}$, and $g_{k,c3}$ respectively. Each element $g_{kci}$ of each $g_{kc}$ corresponds to a specific camera c and a specific POI i in a plurality of POIs 1 through n and, in this example, is equal to 1 when the specific camera is aligned toward the specific POI and equal to zero otherwise. Additionally, and reflecting the constraints under which each configuration was generated, a summation over all i of $g_{kci}$ is equal to 1 for each configuration k and camera c, indicating that each camera is aligned with a single POI, and a summation of $g_{kci}$ over all cameras c is less than or equal to 1, indicating for each POI i and configuration k, indicating that a given POI is surveilled by no more than one camera at a time. Additionally, the final utilization vector $\alpha$ is indicated with elements $\alpha_1$, $\alpha_2$, $\alpha_3$, and so on to $\alpha_K$ with common subscripts indicating the association between the elements $\alpha_k$ and a specific configuration k in the set of configuration vectors.

At step 554, processor 509 selects a configuration $g_k$ from among the individual configuration vectors $g_k$ using a PDF based on the final utilization vector $\alpha$. The PDF acts to return a specific configuration vector $g_k$ from among the set of configuration vectors for specific fraction of selections, where the specific fraction reflects the associated $\alpha_k$ within the final utilization vector $\alpha$ relative to all other elements $\alpha_k$.

Having selected the configuration $g_k$ at 555, processor 509 directs $c_1$ to align towards the POI corresponding to the entry in $g_{k,c1}$ that equals 1, and it directs $c_2$ to align towards the POI corresponding to the entry in $g_{k,c2}$ that equals 1, and it directs $c_3$ to align towards the POI corresponding to the entry in $g_{k,c3}$ that equals 1. In some embodiments, processor 509 communicates directions to a motor controller in mechanical communication with each camera such as motor controllers 512, 513, and 514, and the motor controllers position the camera to align toward the applicable POI in accordance with the communication. In typical embodiments, processor 509 executes 554-555 and repeats the process after some time Δt, as expressed by delay process 556, selecting a subsequent configuration vector from the set of configuration vectors at 552 using the PDF α at 553, and directing $c_1$, $c_2$ and $c_3$ to align in accordance with the subsequent configuration vector.

The system thereby satisfies surveillance requirements $f$ over some total time period T by determining a plurality of camera configurations such that the plurality substantially satisfies the surveillance requirements $f$, and then subsequently providing camera direction based on repeatedly establishing each configuration at a substantially random point within T. Through this methodology, the surveillance system as a whole operates to provide the desired surveillance requirements $f$ over the time period T in a relatively unpredictable manner to an adversary.

In some embodiments, in addition to performing the steps described above, the processor comprising the system additionally determines the placement of camera towers within a geographic operating area comprising POIs at known POI locations, and further determines the surveillance requirements $f$ to be executed by the plurality of cameras comprising the camera towers based on some criterion, such as minimizing a maximum damage that could occur at a given POI should a damaging event go undetected or minimizing an average damage over the plurality of POIs. Some potential methodologies for determining the placement of camera towers and determining the applicable surveillance requirements $f$ are discussed below.

Figures 6, 7:
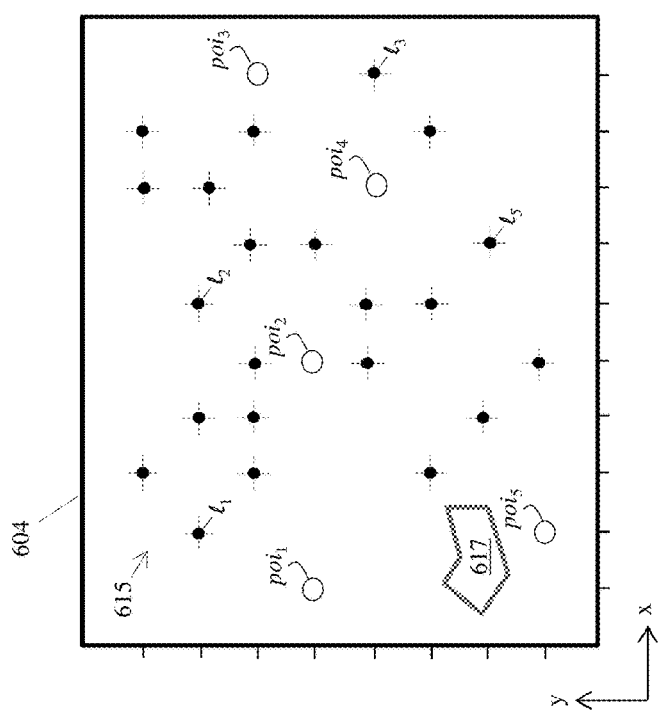
FIG. 6 illustrates another plurality of points-of-interest and a plurality of potential camera-tower locations in a geographic operating area.
FIG. 7 illustrates exemplary probabilities of detection for a plurality of points-of-interest.

Determining Location of Camera Towers and the Surveillance Requirements $f$:

In some embodiments, in addition to performing the steps described above, the processor comprising the system additionally determines the placement of camera towers within a geographic operating area comprising POIs at known POI locations, and further determines the surveillance requirements $f$ to be executed by the plurality of cameras comprising the camera towers based on some criterion, such as minimizing a maximum damage that could occur at any POI should a damaging event go undetected. For example, FIG. 6 illustrates a geographic operating area 604 within which are located a plurality of POIs comprising $poi_1$, $poi_2$, $poi_3$, $poi_4$, and $poi_5$. Geographic operating area 604 is provided with some coordinate system such as the x and y axes illustrated in order to define each potential camera-tower location and each POI location within geographic operating area 604.

To determine the placement of a quantity of $n_T$ camera towers, a processor such as processor 109 receives input data comprising a plurality of potential camera-tower locations, where each potential camera-tower location l comprising the plurality is located on the geographic operating area. For example, FIG. 6 illustrates a plurality of potential camera-tower locations 615 and comprising potential camera-tower locations l such as $l_1$, $l_2$, ..., $l_5$ and others. The location of each of the potential camera-tower locations l within geographic operating area 604 is known and defined by the coordinate system. The processor further receives a number h, where the number h defines the quantity of camera towers to be placed among the plurality of potential camera-tower locations 615.

The processor further receives POI data, where the POI data comprises an expected cost of damage $d_i$ for each POI i. The expected cost of damage for the POI reflects the expected cost should a damaging event at the POI go undetected. The POI data further comprises a probability of detection vector $p_i$ for each POI i, with the probability of detection $p_i$ assessment comprising a plurality of $p_{li}$, where each $p_{li}$ defines a probability of detecting an event at the POI i from one of the potential camera-tower locations comprising the plurality of potential camera-tower locations l. Each $p_{li}$ thereby corresponds to a specific POI and the one of the potential camera-tower locations l. For example, FIG. 7 illustrates an exemplary POI data input 701 for the plurality of POIs $poi_1$, $poi_2$, $poi_3$, $poi_4$, and $poi_5$ of FIG. 6, illustrating a plurality of $p_{li}$ for each POI, for example $p_{11}$, $p_{21}$, $p_{31}$, ..., $P_{h1}$ for $poi_1$, where each $p_{li}$ defines a probability of detecting an event at the POI from one of the potential camera-tower locations $l_1$ through $l_h$, indicated as $l_1$, $l_2$, ..., $l_h$ in FIG. 7. POI data input 701 further comprises an expected cost of damage $d_i$ for each of $poi_1$, $poi_2$, $poi_3$, $poi_4$, and $poi_5$. The assessment of the probability of detection $p_i$ for a given POI i typically reflects a local environment within the geographic operating area, so that, for example and regarding POI data input 701, $p_{11}$ might be ≈1.0, $P_{31}$ might be ≈0.7 due to distance, $P_{15}$ might be ≈0 due to an intervening obstruction such as 617, $p_{25}$ might be ≈0.4 due to a combination of obstruction 617 and distance, and so on.

Minimizing Worst-Case Expected Damage:

Using an additive model of detection probability and assuming that all camera towers are identical, MX1 below provides locations for camera towers and surveillance requirements $f$ to minimizes the maximum (i.e. worst-case) expected damage from an undetected attack.

Indices and Index Sets:

$l \in \mathcal{L}$ potential camera-tower locations $i \in I$ POIs that should be kept under surveillance $c \in C_l$ cameras located on a tower located at $l \in \mathcal{L}$ C set of all cameras, i.e. $C = \cup_{l \in \mathcal{L}} C_l$ Note: To simplify, $n_{C/T} = |C_l|$ for every $l \in \mathcal{L}$ because all towers are assumed to be identical.

Data:

$n_T$ number of camera towers to be installed $n_{I/C}$ maximum number of POIs assignable to a single camera $d_i$ expected cost of damage that an attack at POI i will cause if the attack is not detected $p_{li}$ probability of detecting an attack at POI i from a camera on a tower at camera-tower location l when the camera is surveilling i.

Variables:

$y_l$ 1 if a tower is located at $l \in \mathcal{L}$, 0 otherwise $y_{ci}$ 1 if camera c has some of its surveillance effort assigned to surveil POI i ("allowed assignments"), 0 otherwise $f_{ci}$ probability that camera c is assigned to surveil POI i at any point during the period of observation Formulation MX1:

$$z^*_{MX1} = \min_{y, y, f, z} z \quad (1)$$

Subject to:

$$z \geq d_i \left(1 - \sum_{l \in \mathcal{L}} \sum_{c \in C_l} p_{li} f_{ci}\right) \forall i \in I \quad (2)$$

$$\sum_{l \in \mathcal{L}} y_l = n_T \quad (3)$$

$$\sum_{i \in I} f_{ci} = y_l \forall l \in \mathcal{L}, c \in C_l \quad (4)$$

$$\sum_{l \in \mathcal{L}} \sum_{c \in C_l} f_{ci} \leq 1 \forall i \in I \quad (5)$$

-continued $$f_{ci} \leq \bar{y}_{ci} \, \forall \, c \in C, i \in I \tag{6}$$

$$\sum_{i \in I} \bar{y}_{ci} \leq n_{I/C} y_l \, \forall \, l \in \mathcal{L}, c \in C_l, \tag{7}$$

$$\sum_{c \in C_l} \bar{y}_{ci} \leq y_l \, \forall \, l \in \mathcal{L}, i \in I \tag{8}$$

$$y_l \in \{0, 1\} \, \forall \, l \in \mathcal{L} \tag{9}$$

$$\bar{y}_{ci} \in \{0, 1\} \, \forall \, c \in C, i \in I \tag{10}$$

$$f_{ci} \geq 0 \, \forall \, c \in C, i \in I \tag{11}$$

The objective function (1), together with constraints (2), minimizes the worst case of an approximate expected damage function for undetected attacks across all POIs. Constraint (3) limits the number camera towers being located and installed to the number available $n_T$. Constraints (4) ensure that if a tower is located at potential camera-tower location $l \in \mathcal{L}$, then each camera on the tower will be assigned to surveil some POI with probability 1, and if no tower is located at l then no cameras at l are assigned. Constraints (5) ensure that the total nominal probability of assigning some camera to surveilling a particular POI does not exceed 1; this enforces the requirement that no more than a single camera surveil a POI at any time. Constraints (6) ensure that no surveillance probability is allocated from camera c to POI i unless that camera is assigned explicitly to that POI. Taking advantage of (6), constraints (7) limit the number of POIs that can be surveilled from a single tower; these constraints reflect the limited capabilities of human operators and the loss of effectiveness that would arise if a single camera had to constantly switch alignment from one POI to another. Constraints (8) require that cameras on a single, installed tower be assigned to different POIs. Constraints (9) to (11) limit the variables' domains.

For notational simplicity, the formulation MX1 assumes that every POI $i \in I$ can be usefully surveilled from every potential camera-tower location $l \in \mathcal{L}$. Distance between a camera-tower location and a POI, or the lack of a line of sight, may make surveillance of little or no value between certain pairs (i,l) and the implemented model can be simplified by taking that into account by, for example, setting $p_{li}=0$.

Note that MX1 does not distinguish one camera on a tower from another. Thus, the model may exhibit a great deal of symmetry in potential solutions, a symmetry that will grow with increasing values of $n_{C/T}$. If this causes computational difficulties, standard symmetry-breaking techniques can be applied. For example, see H. Paul Williams, *Model Building in Mathematical Programming* (5$^{th}$, 2013).

In a particular embodiment, MX1 functions to populate a vector y and the surveillance requirements $f$ by minimizing expected damage z. The vector y comprises the elements $y_l$ with each such element corresponding to an individual potential camera-tower location comprising the potential camera-tower locations $l \in \mathcal{L}$ with $y_l$ equal to one if the individual potential camera-tower location has a positive probability of being assigned to surveil to surveil POI i and equal to zero otherwise. The minimization of the expected damage z at (1) is subject to a set of constraints comprising at least one constraint wherein a summation of all $f_{ci}$ corresponding to a single POI is equal to the element $y_l$ corresponding to the individual potential camera-tower location for cameras located on the individual potential camera-tower location, another constraint wherein a summation of elements comprising the vector y equals the quantity $n_T$, and further constrained by requiring that expected damage z be greater than or equal to the expected damage for any single POI, evaluated in a standard fashion. This minimization populates the vector y and indicates the camera-tower locations, and further populates and determines the surveillance requirements $f$. In certain embodiments, a processor such as processor 309 determines the surveillance requirements $f$ in this manner and then utilizes this $f$ as the surveillance-requirements input to perform the steps described by steps 341-350 of FIG. 3.

Game-Theoretic Interpretation of MX1:

This section presents the game-theoretic interpretation of MX1. In this interpretation, the tower-location model includes both the decision vector y for camera-tower locations and the decision vector for camera-to-POI assignments y. Given those decisions, the defender and attacker engage in a simultaneous-play game with decision vectors $f$ and $\varphi$:

a) with probability $f_{ci}$, the defender surveils POI $i \in I$ with camera $c \in C^* | \bar{y}_{ci} = 1$
b) with probability $\varphi_i$, $i \in I$, the attacker attacks POI i.

The model has the formulation:

MMX1

$$z^*_{MMX1} = \min_{y,\bar{y}} \min_f \max_\varphi \sum_{i \in I} d_i \left(1 - \sum_{l \in \mathcal{L}} \sum_{c \in C_l} p_{li} f_{ci}\right) \varphi_i \tag{12}$$

Subject to (3) through (11) above, and $$\sum_{i \in I} \varphi_i = 1 \tag{13}$$

$$\varphi_i \geq 0 \, \forall \, i \in I \tag{14}$$

MX1 formally derives from MMX1 by fixing y, $\bar{y}$ and $f$, taking the dual of the resulting linear program and then releasing the fixed variables. Given this derivation, a standard game-theory result applies to obtain the optimal attack probabilities $\varphi^*$: these are the optimal dual variables for constraints (2) in the linear program that appears after fixing y=y* and $\bar{y}=\bar{y}*$.

Minimizing Average Damage:

In some settings, data may justify the modelling of attacks at each POI as a Poisson process with known rate. Such modelling yields a fixed probability of attack $\hat{\varphi}_1$ for each POI $i \in I$, and lends itself to the following optimization model to minimize the average damage from attacks across all POIs:

$$AVG1 : \min_{y,\bar{y},f} \sum_{i \in I} \hat{\varphi}_i d_i \left(1 - \sum_{l \in \mathcal{L}} \sum_{c \in C_l} p_{li} f_{ci}\right) \tag{15}$$

In a particular embodiment, MMX1 functions to populate a vector y and the surveillance requirements $f$ by conducting the minimization at (15), where the vector y comprises elements $y_l$ as before, and where the objective function is equal to an expression comprising the expected cost of damage $d_i$ for a single POI, the probability $\varphi_i$ of an attack on the single POI, all $p_{li}$ corresponding to the single POI, and all elements $f_{ci}$ corresponding to the single POI. The minimization is subject to a set of constraints at least comprising a constraint wherein a summation of all $f_{ci}$ corresponding to a single POI is equal to the element $y_l$ corresponding to the individual potential camera-tower location for cameras located on the individual potential camera-tower location, and another constraint wherein a summation of elements comprising the vector y is equal to the quantity $n_T$. This minimization populates the vector y and indicates the camera-tower locations, and further populates and determines the surveillance requirements $f$. In certain embodiments, a processor such as processor 309 determines the surveillance requirements $f$ in this manner and then utilizes the surveillance requirements $f$ as the surveillance-requirements input to perform the steps described by steps 341-350 of FIG. 3.

Scheduling:

Scheduling individual cameras comprising a surveillance system is generally conducted as described before. For certain embodiments, let $(y^*, \bar{y}^*, f^*)$ denote a solution to MX1, and define $C^* = \cup_{l \in L|y_l^*=1} C_l$ which is the set of usable cameras following selection of camera-tower locations. This section shows how the surveillance requirements $f$, represented by $f^*$, can be scheduled as surveillance sessions. Such a session is simply a period of time with a valid POI-to-camera assignment; "valid" implies that every camera $c \in C^*$ is assigned to a POI $i \in I$, with at most one camera per POI. In turn, this implies that the additive probability approximation that MX1 uses in (2) is exact.

Let $g_k$ be a 0-1 vector that represents the $k^{th}$ possible assignment of cameras $c \in C^*$ to POIs $i \in I$. That is, $g_{kci}=1$ if camera $c \in C^*$ views POI $i \in I$ in assignment k, and $g_{kci}=0$, otherwise; "at most one camera per POI" implies that $g_{kci} \cdot g_{kc'i}=0$ for all k, i and $c \neq c'$. (For notational simplicity below, allow assignments k with $g_{kci}=1$ for $c \in C^*$, even though $f_{ci}^*=0$, and eliminate variables and constraints using this information.) Finally, let $\mathcal{K}$ denote the index set for all $$\binom{|I|}{|C^*|}$$

assignment vectors. Now, an optimal schedule is represented by a solution $(z_{SKED}^{}, \alpha^{}, s^{})$ to the following linear program, provided that a) $\underline{s}^{} = \underline{0}$ (i.e. $z_{SKED}^{**} = 0$ below)

b) $\sum_{k \in \mathcal{K}} \alpha_k^{} = 1$, i.e., for each $k \in \mathcal{K}$, $\alpha_k^{}$ is the probability that the surveillance sessions represented by $g_k$ should be applied.

$$SKED(\mathcal{K}) \; z_{SKED}^{**} = \min_{\alpha,s} \sum_{c \in C^*} \sum_{i \in I} s_{ci} \quad (16)$$

Subject to:

$$\sum_{k \in \mathcal{K}} g_{cki} \alpha_k + s_{ci} = f_{ci}^* \forall \, c \in C^*, i \in I \quad (17)$$

$$\alpha_k \geq 0 \forall \, k \in \mathcal{K}, s_{ci} \geq 0 \forall \, C^*, i \in I_c \quad (18)$$

If condition (a) is true, summing all constraints (17) gives $\Sigma_{k \in \mathcal{K}} |C| \alpha_k^* = |C|$, which means that condition (b) will hold automatically. Assuming $z_{SKED}^{}=0$, the installed cameras are dynamically scheduled very simply then: every pre-specified interval of time $\Delta t$ (e.g., every 10 minutes), create a new surveillance session by, according to the probability distribution $\alpha^{}$, randomly selecting and applying some assignment $g_k$.

If a valid distribution exists, it can be found by solving SKED($\mathcal{K}$) using a standard, linear-programming-based column-generation procedure, provided that the procedure does not cycle. The procedure follows:

GenDist

Input: I, C, $f^*$ and $C^*$ from MX1.

Output: Optimal probabilities $\alpha_k^{**}$ on assignment vectors $g_k, k \in \mathcal{K}$.
{
$\mathcal{K}' \leftarrow \emptyset$;
Repeat{
Solve SKED($\mathcal{K}'$) for
  (i) $z_{SKED}^{**}$,
  (ii) $\alpha_k^{**}$ for $k \in \mathcal{K}'$;
  (iii) $\mu_{ci}^{**}$ for $c \in C^*$, $i \in I$, which are optimal dual variables for constraints (17);
If ($z_{SKED}^{**}=0$) go to Solved;
Solve this assignment problem for $\hat{g}$:

$$\min_g \sum_{c \in C^*} \sum_{i \in I} \mu_{ci}^{**} g_{ci} \quad (19)$$

Subject to:

$$\sum_{i \in I|f_{ci}^* \geq 0} g_{ci} = 1 \forall \, c \in C^* \quad (20)$$

$$\sum_{c \in C^*|f_{ci}^* \geq 0} g_{ci} \leq 1 \forall \, i \in I \quad (21)$$

$$g_{ci} \in \{0, 1\} \forall \, c \in C^*, i \in I \quad (22)$$

$k \leftarrow k+1$;
$g_k \leftarrow \hat{g}$;
$\mathcal{K}' \leftarrow \mathcal{K}' \cup \{k\}$;
}
Solved:
For ($k \in \mathcal{K}'$) {
Print ("Assign", $g_k$, "with probability", $\alpha_k^{**}$);
}
}

The assignment problem (19) to (22) solves efficiently using combinatorial or linear-programming-based techniques. Further, it can be shown that SKED($\mathcal{K}$) has an optimal solution with $s^{**}=0$. See Salmeron and Wood, "Game-theoretic methods for locating camera towers and scheduling surveillance," *Int. J. Simulation and Process Modelling*, Vol. 12, Nos. 3/4, 2017, which is incorporated by reference in its entirety. In practice, GenDist typically converges in a modest number of steps, and thus no anti-cycling techniques are required.

Computational Results:

All mathematical programs are generated using the standard modelling system GAMS (version 23.3.3), and solved with CPLEX (version 12.6.0.1). A Lenovo W541 laptop computer carries out all computations, running at 2.9 GHz and using 16 GB of RAM. All mixed-integer programs are solved using a relative optimality tolerance of 1%, subject to a time limit of 1,000 seconds.

Scenario Description:

A square study region is modeled with each side having a length of 100 in arbitrary units. Two "geographical scenarios" apply, a medium-sized one "M" and a large-sized one "L". The former has 15 candidate camera-tower locations and 60 POIs and the latter has 30 and 120, respectively. The x- and y-coordinates for all of these are randomly chosen according to a uniform distribution over the study region. Letting $D_{li}$ denote the distance between l and i, and letting $\bar{D}=30$, both geographical scenarios use:

$$p_{li} = \begin{cases} 1 & \text{if } D_{li} \leq \bar{D} \\ \bar{D}^2/D_{li}^2 & \text{if } D_{li} > \bar{D} \end{cases}$$

The reduction in $p_{li}$ with $D_{li}^{-2}$ reflects reduced resolution of an image on a rectangular screen with a given number of pixels as camera-to-POI distance increases.

32 complete "test scenarios" are created from the geographical scenarios M and L, by using variants of:
  a. damage values (either selected according to a discrete uniform distribution over $d_i \in \{1, \ldots, 5\}$ $\forall_i$, or set as $d_i=1$ for all i.)
  b. number of towers to install $n_T \in \{5,10,15,20\}$, depending on the geographical scenario
  c. number of cameras per tower $n_{C/T} \in \{1, \ldots, 12\}$, depending on other parameters.

Table 1 describes the set of test scenarios. For example, M5/10/3 indicates a medium-sized geographical scenario that is completed by specifying $d_i \in \{1, \ldots, 5\}$ $\forall_i$, $n_T=10$ and $n_{C/T}=3$.

Test-Scenario Results:

Tables 2 and 3 present the results for the medium- and large-sized test scenarios, respectively. In addition to the optimal objective value $z_{MX1}^*$ the tables list: $|\mathcal{K}'|$, the total number of assignment vectors that are generated; $|\mathcal{K}''|$ the number of those vectors with positive weight in the optimal scheduling distribution $\alpha^*$; $\Delta_{avg}$, the average number of individual camera-to-POI assignments that change in transitioning from one session to another; $\Delta_{max}$ the maximum number of such changes that can occur; and "Time" which gives the total elapsed seconds used to solve MX1 and execute GenDist. Each row in these tables represents only a single, randomly generated instance. Computational experience indicates that, while optimal objective values may vary greatly among randomly generated instances, the conclusions reached on computational behavior do not change across the range of parameters displayed. Table 2 and Table 3 demonstrate that MX1 and GenDist typically produce good schedules quickly, with probabilities of detection that increase sensibly as $n_{C/T}$ increases. Note also that $|\mathcal{K}'|$, the number of assignments generated, tracks well with total solution time. Thus, this value gives a good implementation-independent measure of the difficulty of solving a particular model instance.

The results above demonstrate a method for optimally locating a set of surveillance-camera towers and then scheduling surveillance of POIs by installed cameras. In typical embodiments, the model seeks to minimize worst-case expected damage from attacks or other events in an adversarial setting, with generally at most one camera surveilling a POI at any time. Further, in certain embodiments and using a two-step process, the disclosure provides a solution technique that solves quickly enough on a laptop computer for practical use. First, the solution to a facility-location-like model identifies camera-tower locations that optimize nominal camera-to-POI assignment probabilities. Then, a linear-programming-based column-generation procedure produces a probability distribution for camera-to-POI assignments—each with at most one camera per POI—whose marginal probabilities match the nominal assignment probabilities.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

Test scenarios analyzed

| Scenario | $|L|$ | $|I|$ | $d_i$ | $n_T$:$n_{C/T}$ |
|---|---|---|---|---|
| Md/$n_T$/$n_{C/T}$ | 15 | 60 | $\{1\}$ | 5: 1, . . . ,12 |
|  |  |  | $\{1,\ldots,5\}$ | 10: 1, . . . ,6 |
| Ld/$n_T$/$n_{C/T}$ | 30 | 120 | $\{1\}$ | 15: 1, . . . ,8 |
|  |  |  | $\{1,\ldots,5\}$ | 20: 1, . . . ,6 |

TABLE 2

Computational results for medium-sized problems

| Scenario $\bar{D}=30$ | $z_{MX1}^*$ | $|K'|$ | $|K''|$ | $\Delta_{avg}$ | $\Delta_{max}$ | Time (sec.) |
|---|---|---|---|---|---|---|
| M1/5/1 | 0.9240 | 106 | 60 | 4.6 | 5 | 18.3 |
| M1/5/2 | 0.8448 | 103 | 58 | 8.4 | 10 | 18.7 |
| M1/5/3 | 0.7642 | 156 | 58 | 11.4 | 15 | 28.6 |
| M1/5/4 | 0.6812 | 88 | 60 | 13.8 | 19 | 19.4 |
| M1/5/5 | 0.6028 | 96 | 60 | 16.0 | 20 | 25.2 |
| M1/5/6 | 0.5193 | 105 | 60 | 16.7 | 23 | 42.7 |
| M1/5/7* | 0.4449 | 95 | 60 | 18.5 | 27 | 1018.9 |
| M1/5/8 | 0.3900 | 114 | 60 | 20.0 | 30 | 39.1 |
| M1/5/9 | 0.3866 | 115 | 58 | 19.7 | 25 | 26.4 |
| M1/5/10 | 0.3866 | 86 | 32 | 14.1 | 20 | 18.6 |
| M1/5/11 | 0.3866 | 26 | 14 | 5.4 | 8 | 7.4 |
| M1/5/12 | 0.3866 | 4 | 4 | 10.1 | 20 | 6.9 |
| M5/5/1 | 3.7218 | 65 | 30 | 3.9 | 5 | 10.8 |
| M5/5/2 | 3.0110 | 45 | 30 | 6.7 | 10 | 8.2 |
| M5/5/3 | 2.5040 | 80 | 38 | 9.3 | 13 | 16.7 |
| M5/5/4 | 2.0062 | 56 | 38 | 10.2 | 17 | 14.8 |
| M5/5/5 | 1.9329 | 128 | 36 | 9.6 | 17 | 23.7 |
| M5/5/6 | 1.9329 | 66 | 26 | 7.8 | 13 | 12.7 |
| M5/5/7 | 1.9329 | 82 | 29 | 9.3 | 14 | 15.8 |
| M5/5/8 | 1.9329 | 50 | 18 | 5.4 | 9 | 9.8 |
| M5/5/9 | 1.9329 | 55 | 16 | 7.1 | 13 | 11.1 |
| M5/5/10 | 1.9329 | 52 | 14 | 5.9 | 10 | 11.1 |
| M5/5/11 | 1.9329 | 58 | 10 | 9.1 | 16 | 16.4 |
| M5/5/12 | 1.9445 | 3 | 3 | 6.7 | 14 | 4.7 |
| M1/10/1 | 0.8386 | 95 | 60 | 8.4 | 10 | 8.4 |
| M1/10/2 | 0.6740 | 83 | 60 | 13.7 | 18 | 13.7 |
| M1/10/3 | 0.5131 | 82 | 60 | 16.6 | 24 | 16.6 |
| M1/10/4 | 0.3866 | 90 | 52 | 17.9 | 25 | 17.9 |
| M1/10/5 | 0.3866 | 105 | 31 | 16.3 | 26 | 16.3 |
| M1/10/6 | 0.3866 | 11 | 11 | 16.7 | 25 | 16.7 |
| M5/10/1 | 2.9892 | 112 | 38 | 6.9 | 10 | 24.0 |
| M5/10/2 | 1.9620 | 124 | 50 | 10.8 | 16 | 29.6 |

TABLE 2-continued

Computational results for medium-sized problems

| Scenario $\overline{D} = 30$ | $Z_{MX1}*$ | \|K'\| | \|K"\| | $\Delta_{avg}$ | $\Delta_{max}$ | Time (sec.) |
|---|---|---|---|---|---|---|
| M5/10/3 | 1.9329 | 81 | 32 | 9.5 | 13 | 99.5 |
| M5/10/4 | 1.9329 | 128 | 25 | 8.9 | 15 | 29.8 |
| M5/10/5 | 1.9329 | 128 | 25 | 8.9 | 15 | 29.5 |
| M5/10/6 | 1.9329 | 68 | 18 | 10.1 | 20 | 16.3 |

TABLE 3

Computational results for large-sized problems

| Scenario $\overline{D} = 30$ | $Z_{MX1}*$ | \|K'\| | \|K"\| | $\Delta_{avg}$ | $\Delta_{max}$ | Time (sec.) |
|---|---|---|---|---|---|---|
| L1/15/1 | 0.8752 | 285 | 119 | 13.1 | 15 | 54.8 |
| L1/15/2 | 0.7501 | 599 | 120 | 22.5 | 26 | 103.1 |
| L1/15/3 | 0.6250 | 131 | 102 | 30.2 | 35 | 32.4 |
| L1/15/4 | 0.5000 | 22 | 13 | 30.0 | 44 | 7.1 |
| L1/15/5 | 0.3750 | 179 | 106 | 37.8 | 44 | 49.2 |
| L1/15/6 | 0.2500 | 83 | 66 | 37.6 | 46 | 26.2 |
| L1/15/7 | 0.1251 | 320 | 106 | 35.3 | 43 | 100.6 |
| L1/15/8 | 0.0000 | 1 | 1 | 0 | 0 | 2.5 |
| L5/15/1 | 3.0457 | 63 | 45 | 10.4 | 14 | 12.3 |
| L5/15/2 | 2.2150 | 132 | 71 | 18.0 | 25 | 26.9 |
| L5/15/3 | 1.6076 | 138 | 89 | 24. | 32 | 34.4 |
| L5/15/4 | 1.0708 | 169 | 89 | 28.9 | 37 | 41.7 |
| L5/15/5 | 0.7758 | 226 | 117 | 32.7 | 47 | 61.9 |
| L5/15/6 | 0.5193 | 310 | 119 | 37.9 | 48 | 99.1 |
| L5/15/7 | 0.2599 | 336 | 117 | 34.8 | 52 | 121.7 |
| L5/15/8 | 0.0000 | 1 | 1 | 0 | 0 | 7.2 |
| L1/20/1 | 0.8753 | 243 | 120 | 13.1 | 15 | 47.6 |
| L1/20/2 | 0.6667 | 144 | 80 | 26.7 | 32 | 34.0 |
| L1/20/3 | 0.5000 | 18 | 8 | 30.0 | 46 | 4.5 |
| L1/20/4 | 0.3333 | 63 | 42 | 36.4 | 46 | 15.8 |
| L1/20/5 | 0.1667 | 318 | 96 | 36.6 | 49 | 89.4 |
| L1/20/6 | 0 | 1 | 1 | 0 | 0 | 3.9 |
| L5/20/1 | 2.7543 | 177 | 71 | 13.6 | 18 | 32.8 |
| L5/20/2 | 1.7847 | 171 | 89 | 22.7 | 32 | 34.9 |
| L5/20/3 | 1.0708 | 160 | 90 | 28.2 | 33 | 35.9 |
| L5/20/4 | 0.6895 | 237 | 105 | 31.1 | 38 | 60.0 |
| L5/20/5 | 0.3447 | 456 | 120 | 35.4 | 48 | 119.8 |
| L5/20/6 | 0 | 1 | 1 | 0 | 0 | 4.61 |

What is claimed is:

1. An apparatus for surveilling points-of-interest (POIs) using camera towers comprising:
    a plurality of camera towers comprising a plurality of cameras where the plurality of cameras satisfy surveillance requirements $f$ at any point during a user-specified time period for a plurality of POIs, where each camera tower is located on a camera-tower location where the camera-tower location is a location on a geographic area, and where an individual POI is located at a POI location on the geographic area, and where the plurality of cameras executes a plurality of joint camera configurations over time to execute the surveillance requirements $f$, and where each camera comprising the plurality of cameras executes its part of the joint camera schedule; and
    a processor programmed to determine the joint camera schedule to execute the surveillance requirements $f$, the processor programmed to perform steps that comprise:
        receiving surveillance-requirements input and defining the surveillance requirements $f$, where the surveillance requirements $f$ comprises elements $f_{ci}$, where each element $f_{ci}$ is associated with a specific camera comprising the plurality of cameras and a specific POI comprising the plurality of POIs, and where the each element $f_{ci}$ defines a portion of the total time period during which the specific camera aligns toward the specific POI;
        establishing a set of configuration vectors where each configuration vector $g_k$ comprises elements $g_{kci}$, where each element $g_{kci}$ is associated with a single element $f_{ci}$, and where each element $g_{kci}$ is equal to a first value or is equal to a second value, and where the each element $g_{kci}$ is equal to the first value if the specific camera associated with the single element $f_{ci}$ is aligned toward the specific POI associated with the single element $f_{ci}$, and is equal to the second value if the specific camera associated with the single element $f_{ci}$ is not aligned toward and focused on the specific POI associated with the single element $f_{ci}$, by performing steps comprising;
            generating a first configuration vector $g_1$ and including this the set of configuration vectors;
            establishing a frequency-of-utilization vector $\alpha$, which comprises elements $\alpha_k$ and where each element $\alpha_k$ is associated with a single configuration vector $g_k$ comprising the set of configuration vectors;
            quantifying the frequency-of-utilization vector $\alpha$ and quantifying a vector s by optimizing a primal objective function subject to a set of primal constraints, where the primal objective function comprises a summation of the elements of the vector s, and where the vector s comprises elements $s_{ci}$ where each element $s_{ci}$ is associated with an individual element $f_{ci}$, and where the each element $s_{ci}$ is equal to an expression comprising the individual element $f_{ci}$, all single elements $g_{kci}$ comprising the set of configuration vectors and associated with the individual element $f_{ci}$, and all elements $\alpha_k$ comprising the frequency-of-utilization vector $\alpha$;
            summing the elements of the vector s; and
            developing a subsequent configuration vector $g_k$, which comprises elements $g_{kci}$, where each element $g_{kci}$ is associated with a certain element $f_{ci}$, and where the each element $g_{kci}$ is equal to a first value or is equal to a second value, and where the each element $g_{kci}$ is equal to the first value if the specific camera associated with the certain element $f_{ci}$ is aligned toward the specific POI associated with the certain element $f_{ci}$ and is equal to the second value if the specific camera associated with the certain element $f_{ci}$ is not aligned toward the specific POI associated with the certain element $f_{ci}$, by performing steps comprising the following:
                valuing a dual vector $\mu$ from certain constraints of the primal model just described, where the dual vector $\mu$ comprises elements $\mu_{ci}$ where each element $\mu_{ci}$ is associated with a single element $s_{ci}$ comprising the vector s, thereby generating a valued dual vector $\hat{\mu}$;
                generating the subsequent configuration vector $g_k$ by optimizing an assignment objective function, where the assignment objective function comprises the valued dual vector $\hat{\mu}$ and all available configuration vectors $g_k$, k=1, ..., K, thereby generating the subsequent configuration vector $\hat{g}$, and including the subsequent configuration vector ĝ in the set of configuration vectors and updating the counter K; and repeating the step that establishes the frequency-of-utilization vector α, the step that quantifies the frequency-of-utilization vector α and quantifies the vector s by optimizing the primal objective function subject to the set of primary constraints, the step that sums the elements of the vector s, the step that develops the subsequent configuration vector ĝ, the step that values the dual vector μ using the dual-variable values for the optimal solution of the primal model, the step that generates the subsequent configuration vector ĝ by optimizing the assignment objective function, and the step that appends the subsequent configuration vector ĝ in the set of configuration vectors, until the summation of the elements of the vector s called $z_{SKED}^{**}$ equals zero with sufficient precision, thereby establishing the set of configuration vectors; and dynamically scheduling all cameras by using the set of configuration vectors to sequentially align toward one or more POIs comprising the plurality of POIs such that the plurality of cameras achieves a configuration described by a plurality of configuration vectors $g_k$ comprising the set of configuration vectors over the total time period of the surveillance requirements $f$, thereby determining the joint camera schedule.

2. The apparatus of claim 1 where the processor is in data communication with the each camera comprising the plurality of cameras, and where the processor is further programmed to communicate the dynamic, joint camera schedule to the each camera comprising the plurality of cameras.

3. The apparatus of claim 2 where the processor is further programmed to schedule the each individual camera comprising the plurality of cameras by performing steps comprising the following:

retrieving a final utilization vector α, where the final utilization vector α is the quantified frequency-of-utilization vector α when the optimized summation of the elements of the vector s called $z_{SKED}^{**}$ is equal to zero;

selecting an individual configuration vector $g_k$ using a probability distribution function (PDF), where the PDF returns a single configuration vector $g_k$ comprising the set of configuration vectors for a specific fraction of selections over a plurality of selections, and where an $α_R$ for the single configuration vector $g_k$ is equal to the element $α_k$ comprising the final utilization vector α and associated with the single configuration vector; and scheduling the each individual camera comprising the plurality of cameras to align toward an individual POI comprising the plurality of POIs based on the individual configuration vector $g_k$.

4. The apparatus of claim 1 where the processor is programmed to optimize the primal objective function subject to the set of primary constraints comprising:

a first constraint set wherein the each element $s_{ci}$ associated with the individual element $f_{ci}$ is equal to a difference between the individual element $f_{ci}$ and a dot product of a first vector and a second vector, where the first vector comprises all elements $g_{kci}$ associated with the individual element $f_{ci}$, and where the second vector comprises all elements $α_k$ comprising the frequency-of-utilization vector α;

a second constraint set wherein the all elements $α_k$ comprising the frequency-of-utilization vector α is greater than or equal to zero; and a third constraint set wherein every element $s_{ci}$ comprising the vector s is greater than or equal to zero.

5. The apparatus of claim 4 where the processor is further programmed to define the surveillance requirements $f$ where the surveillance requirements $f$ comprises a subset of elements $f_c$ corresponding to each individual camera in the plurality of cameras, where the subset of elements $f_c$ comprises a single element $f_{ci}$ corresponding to the each POI comprising the plurality of POIs, such that the single element $f_{ci}$ is associated with the each individual camera and the each POI.

6. The apparatus of claim 5 where the processor is further programmed to define the single element $f_{ci}$ as a nominal probability, which is the probability that camera c is aligned toward POI i at any instant of the surveillance period.

7. The apparatus of claim 6 where the processor is further programmed to establish the set of configuration vectors where the each configuration vector $g_k$ is a 0-1 vector and where every element $g_{kci}$ is equal to one or is equal to zero.

8. The apparatus of claim 1 where the processor is further programmed to determine the camera-tower location of each camera tower and the surveillance requirements $f$ by performing steps comprising the following:

receiving a plurality of potential camera-tower locations, where each potential camera-tower location comprising the plurality of potential camera-tower locations is located in the geographic area;

receiving a quantity $n_T$;

receiving POI data for each POI i, which comprises:
the POI location of the POI;
an expected cost of damage di for the POI; and
a probability of detection assessment $p_{li}$ for the POI and each camera-tower location indexed by l, where each $p_{li}$ in the plurality of $p_{li}$ defines a probability of detecting an event at the POI from one of the potential camera-tower locations l comprising the plurality of potential camera-tower locations, such that the each $p_{li}$ corresponds to the POI and the one of the potential camera-tower locations; and determining the camera-tower location of each camera tower and the surveillance requirements $f$ by:

populating a vector y and the surveillance requirements $f$ by minimizing a damage z, where the vector y comprises elements $y_l$ and where each element $y_l$ corresponds to an individual potential camera-tower location comprising the plurality of potential camera-tower locations and where the each element $y_l$ is equal to one if a given camera tower comprising the plurality of camera towers is assigned to the individual potential camera-tower location and equal to zero otherwise, and where the minimization of the damage z is subject to a set of constraints comprising:

a first constraint set wherein a summation of all $f_{ci}$ associated with a single POI is equal to the each element $y_l$ corresponding to the individual potential camera-tower location when the specific camera associated with the $f_{ci}$ is located on the individual potential camera-tower location corresponding to the each element $y_l$;

a second constraint wherein a summation of elements of the vector y equals the quantity $n_T$; and a third constraint set wherein the damage z is greater than or equal to a damage summation for the single POI, where the damage summation for the single POI is equal to an expression comprising the expected cost of damage $d_i$ for the single POI, all $p_{li}$ corresponding to the single POI, and the all elements $f_{ci}$ associated with the single POI, thereby populating the vector y and generating a populated y vector and thereby determining the surveillance requirements $f$;

additional constraint sets establishing the camera-tower locations using the populated vector y, thereby determining the camera-tower location of each camera tower.

9. The apparatus of claim 1 where the processor is further programmed to determine the camera-tower location of each camera tower and the surveillance requirements $f$ by performing steps comprising the following:

receiving a plurality of potential camera-tower locations, where each potential camera-tower location comprising the plurality of potential camera-tower locations is located in the geographic area;

receiving a quantity $n_T$;

receiving POI data where the POI data comprises:
the POI location of each POI comprising the plurality of POIs;
an expected cost of damage $d_i$ for the POI; and
a probability of detection assessment $p_{li}$ for the POI, where the probability of detection assessment $p_{li}$ for the POI comprises a plurality of $p_{li}$ where each $p_{li}$ in the plurality of $p_{li}$ defines a probability of detecting an event at the POI from one of the potential camera-tower locations comprising the plurality of potential camera-tower locations, such that the each $p_{li}$ corresponds to the POI and the one of the potential camera-tower locations; and determining the camera-tower location of each camera tower and the surveillance requirements $f$ by:
populating a vector y and the surveillance requirements $f$ by minimizing an objective function describing an average damage, where the vector y comprises elements $y_l$ and where each element $y_l$ corresponds to an individual potential camera-tower location comprising the plurality of potential camera-tower locations, and where the each element $y_l$ is equal to one if a given camera tower comprising the plurality of camera towers is assigned to the individual potential camera-tower location and equal to zero if a specific camera tower comprising the plurality of camera towers is not assigned to the individual potential camera-tower location, and where the objective function describing the average damage is equal to an expression comprising the expected cost of damage $d_i$ for a single POI, a probability $\varphi_i$ where the probability $\varphi_i$ is a probability of an attack on the single POI, all $p_{li}$ corresponding to the single POI, and all elements $f_{ci}$ associated with the single POI, and where the minimization of the objective function describing the average damage is subject to a set of constraints comprising:
a first constraint set wherein a summation of all $f_{ci}$ associated with a single POI is equal to the each element $y_l$ corresponding to the individual potential camera-tower location when the specific camera associated with the $f_{ci}$ is located on the individual potential tower location corresponding to the each element $y_l$; and
a second constraint wherein a summation of elements of the vector y is equal to the quantity $n_T$, thereby populating the vector y and generating a populated vector y and thereby determining the surveillance requirements $f$; and additional constraint sets establishing the camera tower locations using the populated vector y, thereby determining the camera tower location of each camera tower.

10. A computer-implemented method for directing surveillance cameras to surveil POIs comprising the following:

providing surveillance-requirements input to a processor, where the surveillance-requirements input defines a portion of a total time period during which each individual camera comprising a plurality of cameras aligns toward each POI comprising a plurality of POIs;

utilizing the processor to direct each specific camera comprising the plurality of cameras, where the processor is programmed to perform steps comprising the following:

receiving the surveillance-requirements input and defining surveillance requirements $f$, where the surveillance requirements $f$ comprises elements $f_{ci}$, where each element $f_{ci}$ is associated with a specific camera comprising the plurality of cameras and a specific POI comprising the plurality of POIs, and where the each element $f_{ci}$ defines a portion of the total time period during which the specific camera aligns toward the specific POI;

establishing a set of configuration vectors where each configuration vector $g_k$ comprises elements $g_{kci}$, where each element $g_{kci}$ is associated with a single element $f_{ci}$, and where the each element $g_{kci}$ is equal to a first value or equal to a second value, and where the each element $g_{kci}$ is equal to the first value if the specific camera associated with the single element $f_{ci}$ is aligned toward the specific POI associated with the single element $f_{ci}$ and is equal to the second value if the specific camera associated with the single element $f_{ci}$ is not aligned toward the specific POI associated with the single element $f_{ci}$, by performing steps comprising;

generating a first configuration vector $g_k$ and including that vector in the set of configuration vectors, where the number of current configuration vectors is K=1;

establishing a frequency-of-utilization vector $\alpha=(\alpha_1, \alpha_2, \ldots, \alpha_K)$ and establishing a vector s which comprises elements $s_{ci}$ corresponding to the each camera c and each POI i;

quantifying the frequency-of-utilization vector $\alpha$ and quantifying the vector s by minimizing a primal objective function, where the primal objective function comprises a summation of the elements of the vector s, and where the minimization of the primal objective function is subject to a set of primal constraints;

summing the elements of the vector s; and developing a subsequent configuration vector $g_k$, where the subsequent configuration vector $g_k$ comprises elements $g_{kci}$, where each element $g_{kci}$ is associated with a certain element $f_{ci}$, and where the each element $g_{kci}$ is equal to a first value or is equal to a second value, and where the each element $g_{kci}$ is equal to the first value if the specific camera associated with the certain element $f_{ci}$ is aligned toward and focused on the specific POI associated with the certain element $f_{ci}$ and is equal to the second value if the specific camera associated with the certain element $f_{ci}$ is not aligned toward the specific POI associated with the certain element $f_{ci}$, by performing steps that comprise:

valuing a dual vector μ using a dual of the primal objective function and the set of primary constraints, where the dual vector μ comprises elements $μ_{ci}$ where each element $μ_{ci}$ is associated with a single element $s_{ci}$ comprising the vector s, thereby generating a valued dual vector μ;

generating the subsequent configuration vector $g_k$, by optimizing an assignment objective function, where the assignment objective function comprises the valued dual vector μ and the subsequent configuration vector $g_k$ thereby generating the subsequent configuration vector $g_k$;

including the subsequent configuration vector $g_k$ in the set of configuration vectors; and repeating the step that establishes the frequency-of-utilization vector α, quantifying the frequency-of-utilization vector α and quantifying the vector s by optimizing the primal objective function subject to the set of primal constraints; the summing the elements of the vector s step; the step that develops the subsequent configuration vector $g_k$; the step that establishes the dual vector μ using the dual of the primal objective function and the set of primary constraints; the step that generates the subsequent configuration vector ĝ; and, the step that includes the subsequent configuration vector $g_k$ in the set of configuration vectors until the summation of the elements of the vector s is less than or equal to a pre-determined value approximating 0, thereby establishing the set of configuration vectors; and retrieving a final utilization vector α, where the final utilization vector α is the quantified frequency-of-utilization vector α when the optimized summation of the elements of the vector s called $z_{SKED}$** is equal to zero;

selecting an individual configuration vector $g_k$ using a probability distribution function (PDF) where the PDF returns a single configuration vector $g_k$ comprising the set of configuration vectors for a specific percentage of selections over a plurality of selections; and directing each single camera in the plurality of cameras to align toward a single POI comprising the plurality of POIs based on the individual configuration vector $g_k$, thereby directing surveillance cameras to surveil POIs.

11. The computer-implemented method of claim 10 where the processor is programmed to optimize the primal objective function subject to the set of primary constraints comprising:

a first constraint set wherein the each element $s_{ci}$ associated with the individual element $f_{ci}$ is equal to a difference between the individual element $f_{ci}$ and a dot product of a first vector and a second vector, where the first vector comprises all elements $g_{kci}$ associated with the individual element $f_{ci}$, and where the second vector comprises all elements $α_k$ comprising the frequency-of-utilization vector α;

a second constraint set wherein the all elements $α_k$ comprising the frequency-of-utilization vector α is greater than or equal to zero; and a third constraint set wherein every element $s_{ci}$ comprising the vector s is greater than or equal to zero.

12. The computer-implemented method of claim 11 where the processor is programmed to define the surveillance requirements $f$ which comprise a subset of elements $f_c$ corresponding to each individual camera in the plurality of cameras, where the subset of elements $f_c$ comprises a single element $f_{ci}$ corresponding to the each POI i comprising the plurality of POIs, such that the single element $f_{ci}$ is associated with the camera c and the POI i.

13. The computer-implemented method of claim 12 where the processor is programmed to define the single element $f_{ci}$ as nominal surveillance effort, where this nominal effort defines the probability that camera c should be observing POI i at any point during the total period of observation.

14. The computer-implemented method of claim 13 where the processor is programmed to establish the set of configuration vectors where the each configuration vector $g_k$ is a 0-1 vector.

15. An apparatus for surveilling points-of-interest (POIs) for a specified period of time T comprising:

a plurality of camera towers comprising a plurality of cameras where the plurality of cameras satisfies surveillance requirements $f$ over the total time period for a plurality of POIs, where each camera tower is located at a camera-tower location which is a location on a geographic area, and where an individual POI is located at a POI location on the geographic area, and where the plurality of cameras executes a joint camera schedule to satisfy the surveillance requirements $f$, and where each camera comprising the plurality of cameras executes its part of the joint camera schedule; and a processor in data communication with the each camera comprising the plurality of cameras and the processor programmed to determine the joint camera schedule whose execution satisfies surveillance requirements $f$ by performing steps that comprise:

I) receiving surveillance-requirements input and determining the surveillance requirements $f$, where the surveillance requirements $f$ comprises elements $f_{ci}$, where each element $f_{ci}$ defines the probability that camera c comprising the plurality of cameras aligns toward a specific POI i comprising the plurality of POIs, and where the surveillance requirements $f$ comprises a subset of elements $f_c$ corresponding to the specific camera, where the subset of elements $f_c$ comprises a single element $f_{ci}$ corresponding to each POI comprising the plurality of POIs, such that the single element $f_{ci}$ corresponds to the specific camera and the each POI;

II) receiving a value $z_{SKED}$ where the value $z_{SKED}$ is greater than or equal to zero;

III) establishing a set of configuration vectors where each configuration vector $g_k$ comprises elements $g_{kci}$, where every element $g_{kci}$ is equal to a first value or is equal to a second value, and where the each configuration vector $g_k$ comprises a subset of elements $g_{kc}$ corresponding to the specific camera, where the subset of elements $g_{kc}$ comprises a single element $g_{kci}$ corresponding to the each POI, such that the single element $g_{kci}$ corresponds to the specific camera and the each POI, and where the single element $g_{kci}$ is equal to the first value if the specific camera is aligned toward the each point of interest and is equal to the second value if the specific camera is not aligned toward the each point of interest, by performing steps comprising;

III)A) generating a first configuration vector $g_1$ and including that vector in the set of configuration vectors, where the number of current configuration vectors is K=1;

III)B) establishing a frequency-of-utilization vector $\alpha=(\alpha_1, \alpha_2, \ldots, \alpha_K)$ and establishing a vector s which comprises elements $s_{ci}$ corresponding to the each camera c and each POI i;

III)C) quantifying the frequency-of-utilization vector $\alpha$ and quantifying the vector s by minimizing a primal objective function, where the primal objective function comprises a summation of the elements of the vector s, and where the minimization of the primal objective function is subject to a set of primal constraints comprising:

III)C)1) a first constraint set wherein the single element $s_{ci}$ corresponding to the specific camera and the each POI is equal to a difference between the single element $f_{ci}$ corresponding to the specific camera and the each POI and a dot product of a first vector and a second vector, where the first vector comprises all single elements $g_{kci}$ comprising the set of configuration vectors and corresponding to the specific camera and the each POI, and where the second vector comprises all elements $\alpha_k$ comprising the frequency-of-utilization vector $\alpha$;

III)C)2) a second constraint set wherein all elements $\alpha_k$ comprising the frequency-of-utilization vector $\alpha$ are greater than or equal to zero; and III)C)3) a third constraint set wherein every element $s_{ci}$ comprising the vector s is greater than or equal to zero, thereby quantifying the frequency-of-utilization vector $\alpha$ and quantifying the vector s; and III)D) summing the elements of the vector s;

III)E) developing a subsequent configuration vector $g_k$ for k=K+1, if the summation of the elements of the vector s called $z_{SKED}^{**}$ is greater than zero, where the subsequent configuration vector $g_k$ comprises elements $g_{kci}$, where each such element is equal to the first value or is equal to the second value, and where the subsequent configuration vector $g_k$ comprises a subset of elements $g_{kc}$ corresponding to the specific camera, where the subset of elements $g_{kc}$ comprises a single element $g_{kci}$ corresponding to the each point-of-interest, such that the single element $g_{kci}$ corresponds to the specific camera and the each point-of-interest, and where the single element $g_{kci}$ is equal to the first value if the specific camera is aligned toward and focused on the point of interest i and is equal to the second value if the specific camera is not aligned toward and focused on the point of interest i, by performing steps that comprise:

III)E)1) determining a set of optimal dual variables using the set of primal constraints;

III)E)2) defining a dual objective function using the primal constraints;

III)E)3) determining a dual vector $\mu$, by maximizing the dual objective function subject to the set of dual constraints, where the dual vector $\mu$ comprises elements $\mu_{ci}$ which correspond to the specific camera c and the specific point-of-interest i;

III)E)4) generating the subsequent configuration vector $g_k$ for subsequent k=K+1, by minimizing an assignment objective function, where the assignment objective function comprises a dot product of a third vector comprising the valued dual vector $\mu$ and a fourth vector comprising the subsequent configuration vector $g_k$, and where the minimization of the assignment objective function is subject to one constraint set wherein the specific camera comprising the plurality of cameras is aligned toward some point-of-interest in the plurality of POIs, and subject to an additional constraint set wherein only a single camera comprising the plurality of cameras is aligned toward specific point-of-interest comprising the plurality of POIs, thereby generating the subsequent configuration vector $\hat{g}$; and III)E)5) including the subsequent configuration vector g in the set of configuration vectors; updating the cardinality of the configuration set: K=K+1; and III)E)6) repeating step III)B), step III)C), step III)C)1), step III)C)2), step III)C)3), step III)D), step III)E), step III)E)1), step III)E)2), step III)E)3), step III)E)4), and step III)E)5) until the minimized summation of the elements of the vector s at step III)D) called $z_{SKED}^{}$ is equal to zero with a pre-specified accuracy; and IV) retrieving a final frequency-of-utilization vector $\alpha=(\alpha_1, \alpha_2, \ldots, \alpha_K)$, which is a sufficiently accurate probability distribution function, meaning that all elements are non-negative, add up to exactly one, and $z_{SKED}^{}$ equals 0 with a pre-specified accuracy;

V) selecting an individual configuration vector $g_k$ with probability $\alpha_k$;

VI) directing each single camera in the plurality of cameras to align toward a single point-of-interest comprising the plurality of POIs based on the individual configuration vector $g_k$ for a period of time $\Delta t$ if the system is operated with a constant time interval $\Delta t$, or for a period of time $\Delta t_k$, if the system is operated with a randomly chosen time intervals $\Delta t_k$; and VII) repeating step V) and step VI) until a period of time greater than the total time period has elapsed, thereby surveilling POIs over the total time period.

16. The apparatus of claim 15 where the processor is further programmed to define the single element $f_{ci}$ as the probability that camera c should be aligned and focused on POI i, and where the processor is further programmed to establish the set of configuration vectors where the each configuration vector $g_k$ is a 0-1 vector.

17. The apparatus of claim 16 where the processor is further programmed to determine the camera-tower location of each camera tower and the surveillance requirements $f$ by performing steps that comprise:

receiving a plurality of potential camera-tower locations, where each potential tower location $l \in \mathcal{L}$ comprising the plurality of potential camera-tower locations is located in the geographic area;

receiving a quantity $n_T$;

receiving POI data which comprises:
the location of each POI comprising the plurality of POIs;
an expected cost of damage $d_i$ for each POI i; and an assessment $p_{li}$ of the probability of detection of a damaging event for each POI i and each potential camera-tower location l; and determining the camera-tower location of each camera tower and the surveillance requirements $f$ by:

populating a vector y and the surveillance requirements $f$ by minimizing a total damage value z, where the vector y comprises elements $y_l$, each of which corresponds to a potential camera-tower location l comprising the plurality of potential camera-tower locations, and where the each element $y_l$ is equal to one if a given camera tower comprising the plurality of camera towers is assigned to the individual potential camera-tower location l and is equal to zero otherwise, and where the minimization of the damage z is subject to a set of constraints comprising:

a first constraint set wherein a summation over cameras c of all $f_{ci}$ associated with a single POI i is equal to the each element $y_l$ corresponding to the individual potential camera-tower location when the specific camera associated with the $f_{ci}$ is located on the individual potential camera-tower location corresponding to the each element $y_l$;

a second constraint wherein the summation of all elements of the vector y is equal to the quantity $n_T$; and a third constraint set wherein the total damage z is greater than or equal to a damage summation for the single point-of-interest, where the damage summation for the single point-of-interest is equal to an expression comprising the expected cost of damage $d_i$ for the single point-of-interest, all $p_{li}$ corresponding to the single point-of-interest, and the all elements $f_{ci}$ corresponding to the single point-of-interest, thereby populating the vector y and generating a populated vector y and thereby determining the surveillance requirements $f$;

and additional constraint sets establishing the camera-tower locations using the populated vector y.

18. The apparatus of claim 16 where the processor is further programmed to determine the camera-tower location of each camera tower and the surveillance requirements $f$ by performing steps that comprise:

receiving a plurality of potential camera-tower locations, where each potential camera-tower location is located on the geographic area;

receiving a quantity $n_T$, which is the number of camera towers available;

receiving POI data which comprises:

the location of each POI comprising the plurality of POIs;

an expected cost of damage $d_i$ for each POI i; and an assessment $p_{li}$ of the probability of detection of a damaging event at each POI i from a camera at each of the potential camera-tower locations l; and determining the camera-tower location of each camera tower and the surveillance requirements $f$ by:

populating a vector y and the surveillance requirements $f$ by minimizing an objective function describing an average damage, where the vector y comprises elements $y_l$ and where each element $y_l$ corresponds to an individual potential camera-tower location comprising the plurality of potential camera-tower locations, and where the each element $y_l$ is equal to one if a given camera tower comprising the plurality of camera towers is assigned to the individual potential camera-tower location and is equal to zero otherwise, and where the objective function describing the average damage is equal to an expression comprising the expected cost of damage $d_i$ for a single POI, a probability Pi where the probability $\varphi_i$ is a probability of an attack on or a probability of a damaging event at the single POI, all $p_{li}$ corresponding to the single POI, and all elements $f_{ci}$ associated with the single POI, and where the minimization of the objective function describing the average damage is subject to sets of constraints comprising:

a first constraint set wherein, for each potential camera-tower location l, the summation of all $f_{ci}$ associated with a single POI i equals $y_l$, and a second constraint set consisting of a single constraint, wherein a summation of elements of the vector y is equal to the quantity $n_T$, implying that the number of potential camera-tower locations used equals the number of towers available, which is $n_T$; and additional constraint sets establishing the camera-tower locations to be used among the potential camera-tower locations by populating the vector y.

* * * * *